United States Patent
Harvey

(10) Patent No.: US 10,757,474 B2
(45) Date of Patent: Aug. 25, 2020

(54) METHOD AND APPARATUS FOR PROTECTING DATA VIA APPLICATION OF CORRUPTING FUNCTION AND COMPLIMENTARY RESTITUTION AT VIDEO PROCESSING ENDPOINTS

(71) Applicant: Twentieth Century Fox Home Entertainment LLC, Los Angeles, CA (US)

(72) Inventor: Ian Harvey, Lake Forest, CA (US)

(73) Assignee: Twentieth Century Fox Home Entertainment LLC, Los Angeles, CA (US)

( * ) Notice: Subject to any disclaimer, the term of this patent is extended or adjusted under 35 U.S.C. 154(b) by 175 days.

(21) Appl. No.: 15/965,302

(22) Filed: Apr. 27, 2018

(65) Prior Publication Data
US 2019/0335233 A1 Oct. 31, 2019

(51) Int. Cl.
*H04N 21/4405* (2011.01)
*H04N 21/2347* (2011.01)
(Continued)

(52) U.S. Cl.
CPC ....... *H04N 21/44055* (2013.01); *H04N 19/88* (2014.11); *H04N 21/23473* (2013.01);
(Continued)

(58) Field of Classification Search
CPC ............. H04N 19/88; H04N 21/23473; H04N 21/4312; H04N 21/44004; H04N 21/44055; H04N 21/4623; H04N 21/8358
See application file for complete search history.

(56) References Cited

U.S. PATENT DOCUMENTS 5,237,610 A 8/1993 Gammie et al.
6,505,299 B1 1/2003 Zeng et al.
(Continued)

OTHER PUBLICATIONS

Rouvroy, G., et al., "Reconfigurable Hardware Solutions for the Digital Rights Management of Digital Cinema", Conference: Proceedings of the 2004 ACM Workshop on Digital Rights Management 2004, Oct. 25, 2004, pp. 1-13, Washington, DC, USA.
(Continued)

*Primary Examiner* — Rong Le
(74) *Attorney, Agent, or Firm* — Farjami & Farjami LLP

(57) ABSTRACT

A system, method and apparatus for protecting a media program having a plurality of frames is disclosed. In one embodiment, the method comprises receiving an encrypted plurality of compressed frames in a client device, wherein at least a first portion of the plurality of frames is corrupted before encryption according to one or more corruption operations; decrypting the plurality of compressed frames, decompressing the plurality of compressed frames to recover the plurality of frames, including the first portion of frames corrupted according to the one or more corruption operations, storing the plurality of frames in a frame buffer, extracting the stored plurality of frames from the frame buffer for processing by a graphics processing unit of the client device, at least substantially decorrupting at least some of the corrupted plurality of frames according to one or more decorruption operations in the graphics processing unit, and providing the plurality of frames including the decorrupted plurality of frames for display.

22 Claims, 14 Drawing Sheets

(51) Int. Cl.
  *H04N 21/44* (2011.01)
  *H04N 21/4623* (2011.01)
  *H04N 21/8358* (2011.01)
  *H04N 19/88* (2014.01)
  *H04N 21/431* (2011.01)

(52) U.S. Cl.
  CPC ... *H04N 21/4312* (2013.01); *H04N 21/44004* (2013.01); *H04N 21/4623* (2013.01); *H04N 21/8358* (2013.01)

(56) References Cited

U.S. PATENT DOCUMENTS

| | | |
|---|---|---|
| 7,130,425 B2 | 10/2006 | Strasser et al. |
| 7,159,112 B1 | 1/2007 | Williams |
| 7,203,319 B2 | 4/2007 | Ben-Zur et al. |
| 7,376,243 B2 | 5/2008 | Fudge et al. |
| 7,613,298 B2 | 11/2009 | LeComte et al. |
| 7,801,326 B2 | 9/2010 | Zhao |
| 8,234,217 B2 | 7/2012 | Derrenberger |
| 8,503,671 B2 | 8/2013 | Chen |
| 8,565,426 B2 | 10/2013 | Chaney |
| 9,124,771 B2 | 9/2015 | Zou et al. |
| 9,277,223 B2 | 3/2016 | Ziesler |
| 9,467,658 B2 | 10/2016 | Candelore |
| 2002/0129280 A1 | 9/2002 | Wang |
| 2005/0008157 A1 | 1/2005 | Hjelm |
| 2007/0172055 A1 | 7/2007 | Jo |
| 2007/0277039 A1* | 11/2007 | Zhao ............... G06T 1/0085 713/176 |
| 2008/0123845 A1 | 5/2008 | Candelore |
| 2009/0060182 A1 | 3/2009 | Killian et al. |
| 2010/0246819 A1* | 9/2010 | Candelore .......... H04L 9/0822 380/210 |
| 2012/0300926 A1* | 11/2012 | Zou ................. H04N 7/1675 380/210 |
| 2015/0319146 A1 | 11/2015 | Chen et al. |
| 2016/0105730 A1* | 4/2016 | Hunacek .......... H04N 21/4405 725/31 |
| 2016/0283722 A1 | 9/2016 | Milstein |

OTHER PUBLICATIONS

Chakravarthi, K., et al., "Augmentation of Image Compression System and Security Exploiting Random Permutation", International Journal of Mechanical Engineering and Computer Applications, Jan.-Feb. 2016, pp. 140-144, vol. 4, No. 1.

Griwodz, C., et al., "Protecting VoD the Easier Way", Presented at ACM Multimedia 1998, Sep. 12-16, 1998, pp. 1-8, Bristol Uk.

Wu, T-L, et al., "Selective Encryption and Watermarking of MPEG Video (Extended Abstract)", International Conference on Image Science, Systems, and Technology, CISST'97., 1997, pp. 0-9.

* cited by examiner

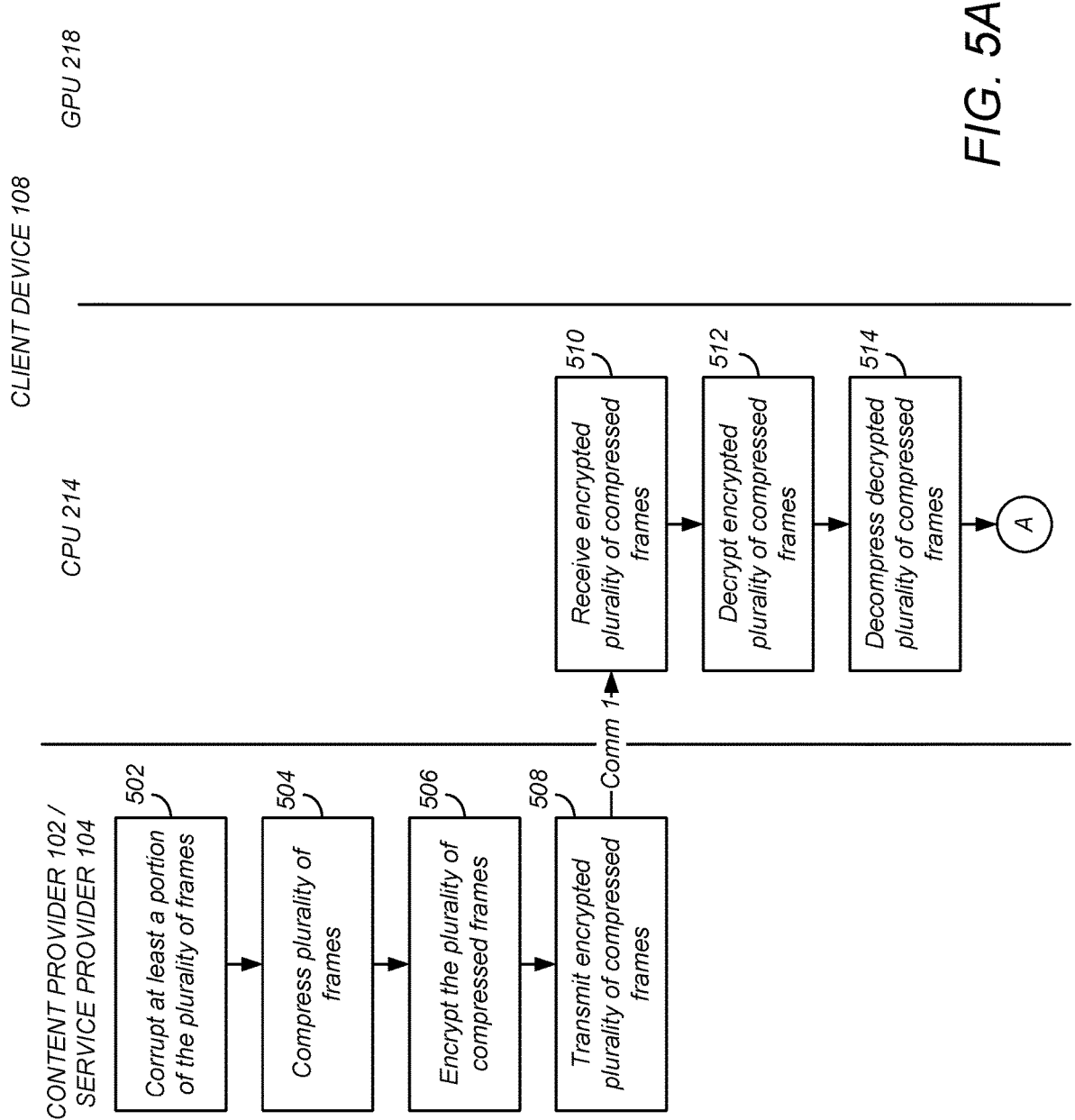

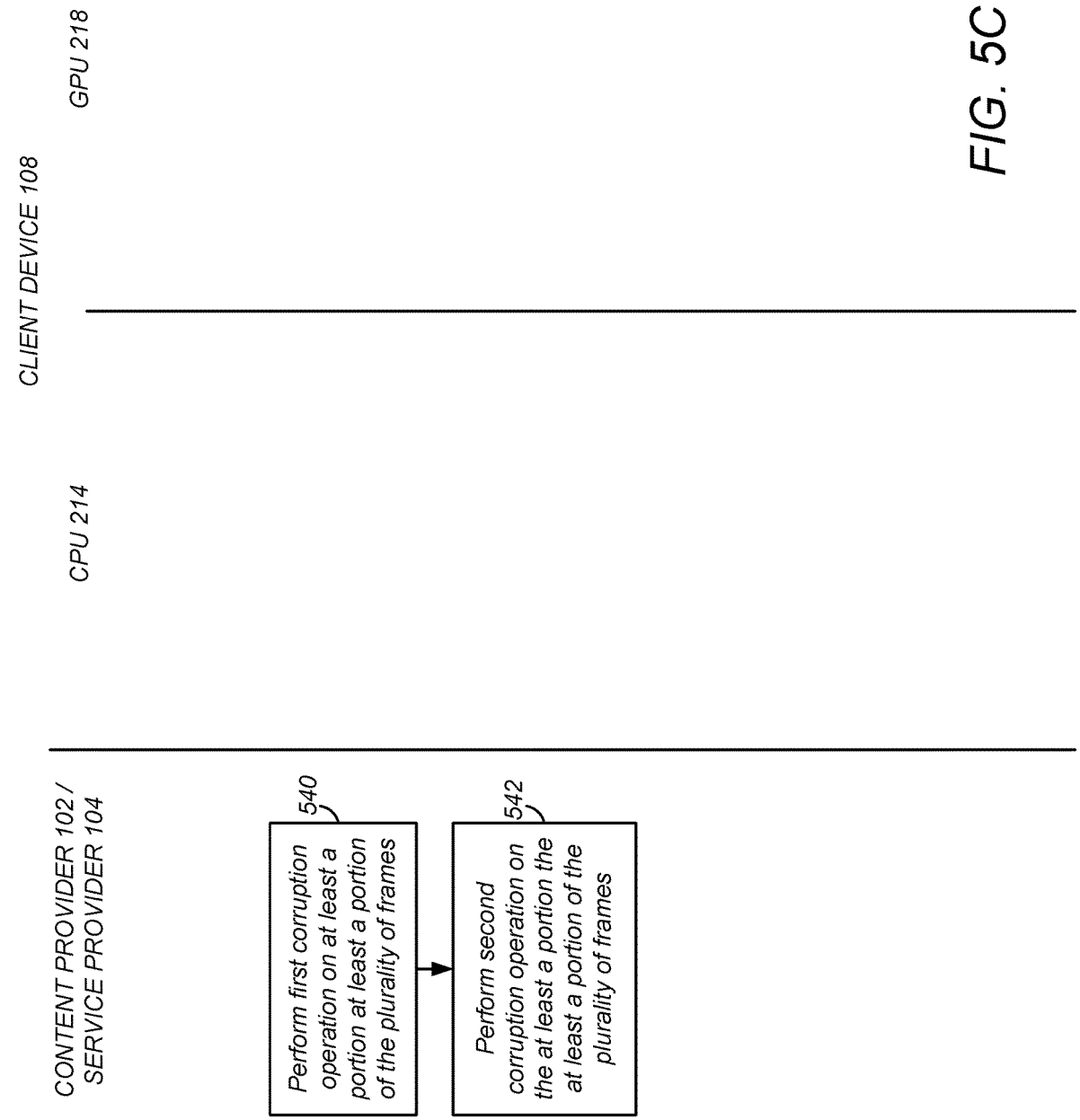

METHOD AND APPARATUS FOR PROTECTING DATA VIA APPLICATION OF CORRUPTING FUNCTION AND COMPLIMENTARY RESTITUTION AT VIDEO PROCESSING ENDPOINTS

BACKGROUND

1. Field

The present disclosure relates to systems and methods for securely distributing media programs, and in particular to a system and method for protecting the media programs via corrupting operations.

2. Description of the Related Art

The digitization of audio visual media content such as television shows and movies has enabled widespread dissemination if high quality versions of the media content for personal enjoyment. Such media content may be disseminated via tangible media such as optical discs, or by transmission by non-tangible means such as transmission by traditional broadcast (e.g. satellite, cable, or terrestrial transmitters) or via the Internet (e.g. streaming or downloading and storing media content for later playback), or via a kiosk. In any of these distribution paradigms, viewers may purchase their own copies of such media content for personal enjoyment.

Unfortunately, the digitalization of such media content has also permitted large scale and widespread unauthorized dissemination and/or use. Such unauthorized dissemination and/or use deprive providers of the audio visual media content the economic benefit of authoring such material. How to reduce such "piracy," while retaining the benefits of widespread and easy dissemination of digital media content remains a challenge. However, the ubiquitous nature of digital communications and other technologies permit the definition of new dissemination and protection paradigms that can permit widespread dissemination of digital media, while suppressing unlicensed use of such digital media. The disclosure that follows describes an apparatus and method employing such a paradigm.

SUMMARY

To address the requirements described above, this document discloses a system and method for protecting a media program having a plurality of frames. In one embodiment, the method comprises receiving an encrypted plurality of compressed frames in a client device, where at least a first portion of the plurality of frames is corrupted before encryption according to one or more corruption operations; decrypting the plurality of compressed frames; decompressing the plurality of compressed frames to recover the plurality of frames, including the first portion of frames corrupted according to the one or more corruption operations; storing the plurality of frames in a frame buffer; extracting the stored plurality of frames from the frame buffer for processing by a graphics processing unit of the client device; at least substantially decorrupting at least some of the corrupted plurality of frames according to one or more decorruption operations in the graphics processing unit; and providing the plurality of frames including the decorrupted plurality of frames for display.

Another embodiment is evidenced by an apparatus for protecting a media program having a plurality of frames, comprising: a client device, comprising: a first processing unit communicatively coupled to a first memory; a second processing unit communicatively coupled to second memory and a frame buffer; the first memory storing first processing unit instructions comprising first processing unit instructions for: receiving an encrypted plurality of compressed frames in a client device, where at least a first portion of the plurality of frames is corrupted according to one or more corruption operations; decrypting the plurality of compressed frames; decompressing the plurality of compressed frames to recover the plurality of frames, including the first portion of frames corrupted according to the one or more corruption operations; storing the plurality of frames in a frame buffer; the second memory storing second processing unit instructions comprising second processing unit instructions for: extracting the stored plurality of frames from the frame buffer for processing by a graphics processing unit of the client device; at least substantially decorrupting at least some of the corrupted plurality of frames according to one or more decorruption operation in the graphics processing unit. The first processing unit and the second processing unit provides the plurality of frames including the decorrupted plurality of frames for display.

BRIEF DESCRIPTION OF THE DRAWINGS

Referring now to the drawings in which like reference numbers represent corresponding parts throughout:

FIGS. 5A-5E are diagrams illustrating exemplary operations that can be used to disseminate the media program.

DESCRIPTION

In the following description, reference is made to the accompanying drawings which form a part hereof, and which is shown, by way of illustration, several embodiments. It is understood that other embodiments may be utilized and structural changes may be made without departing from the scope of the present disclosure.

Dissemination of Media Programs

Figure 1:
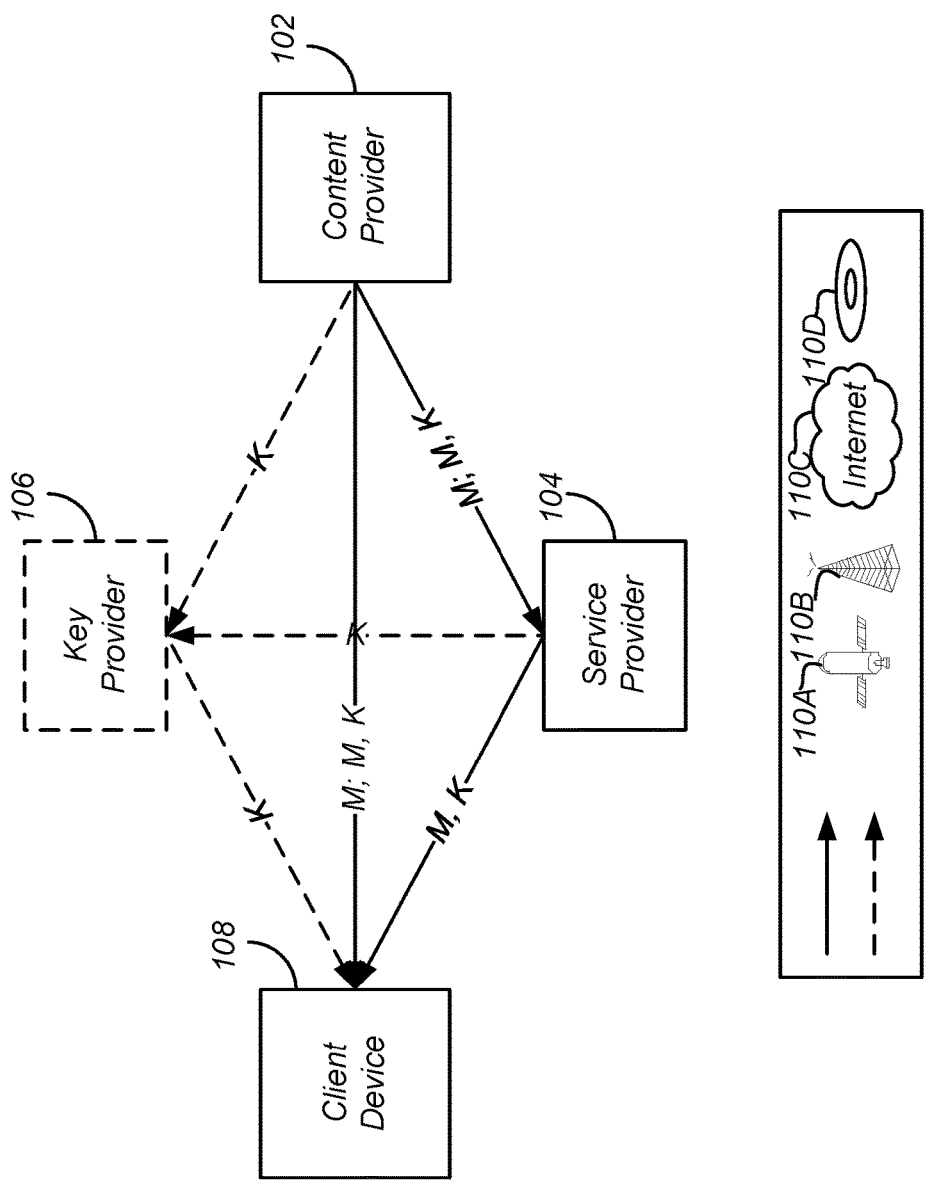
FIG. 1 is a diagram depicting one embodiment of a media program dissemination system.

FIG. 1 is a diagram depicting one embodiment of a media program dissemination system (MPDS) 100. The MPDS 100 includes a content provider 102, a service provider 104 and a client device 108. The content provider 102 is an entity that generates media programs (M) that are to be transmitted to the client device 108. Such entities may include, for example, entities such as FOX, HBO or NBC. The content provider 102 can provide the media programs to the client device 108 directly (e.g. by transmission from the content provider 102 to the client device) or via a service provider 104 such as DIRECTV, DISH or CABLEVISION. Such service providers 104 receive the media program from the content provider 102, and provide the media programs to client devices 108 for presentation. Generally speaking, the content provider 102 or service provider 104 may also include a retailer selling a tangible copy of the media program. In different embodiments, the client device 108 may comprise a smartphone, a tablet computer, a laptop computer, a desktop computer, set-top box (STB) or integrated receiver/decoder (IRD) which is typically provided by the service provider 104 to the user, a television or display.

To prevent the media programs from unauthorized display and/or reproduction, such media programs are typically encrypted so as to be decryptable for viewing only via the use of one or more decryption keys (K). As indicated in FIG. 1, the transmission of the media program or the key(s) may be by transmission means 110 including conventional satellite 110A or terrestrial 100B transmission, the Internet 110C, or by tangible media 110D.

In a typical broadcast embodiment, the content provider 102 provides the media program M to the service provider 104, and service provider encrypts the media program, and provides the encrypted program and the key required to decrypt the media program to the client device 108. The transmission of the media program from the content provider 102 to the service provider 104 is also typically protected by encrypting the transmission with according to a key or other artifice to protect the media program during such transmission, although this encryption protocol is typically different than the protocol used to transmit the media program to the client device 108.

In another typical broadcast environment, the content provider 102 provides the media program directly to the client device 108, for example, by transmission via the Internet. For example, FOX may maintain a website by which users can stream media programs to client devices directly from a FOX server.

In another embodiment, the content provider 102 copies an encrypted version of the media program to a tangible memory device such as a DVD or flash drive, and provides that to the client device 108, either directly or via a third party such as a retailer.

In any of the foregoing embodiments, key(s) or other data needed to decrypt and present the media program may be transmitted along with the media program itself, or separate from the media program. Further, the means used to transmit the key(s) may be different than the means used to transmit the media program itself. For example, the media program may be transmitted by satellite 11A, with the key(s) transmitted by the Internet 110C. Or, the media program may be transmitted in a tangible form 110D, with the key(s) transmitted by the Internet 110C.

Also, in any of the foregoing embodiments, the key(s) may also be transmitted via key provider 106 entity, which accepts the key(s) from the content provider and/or the service provider 104 and transmits the key(s) to the client device 108 for use.

Figure 2A:
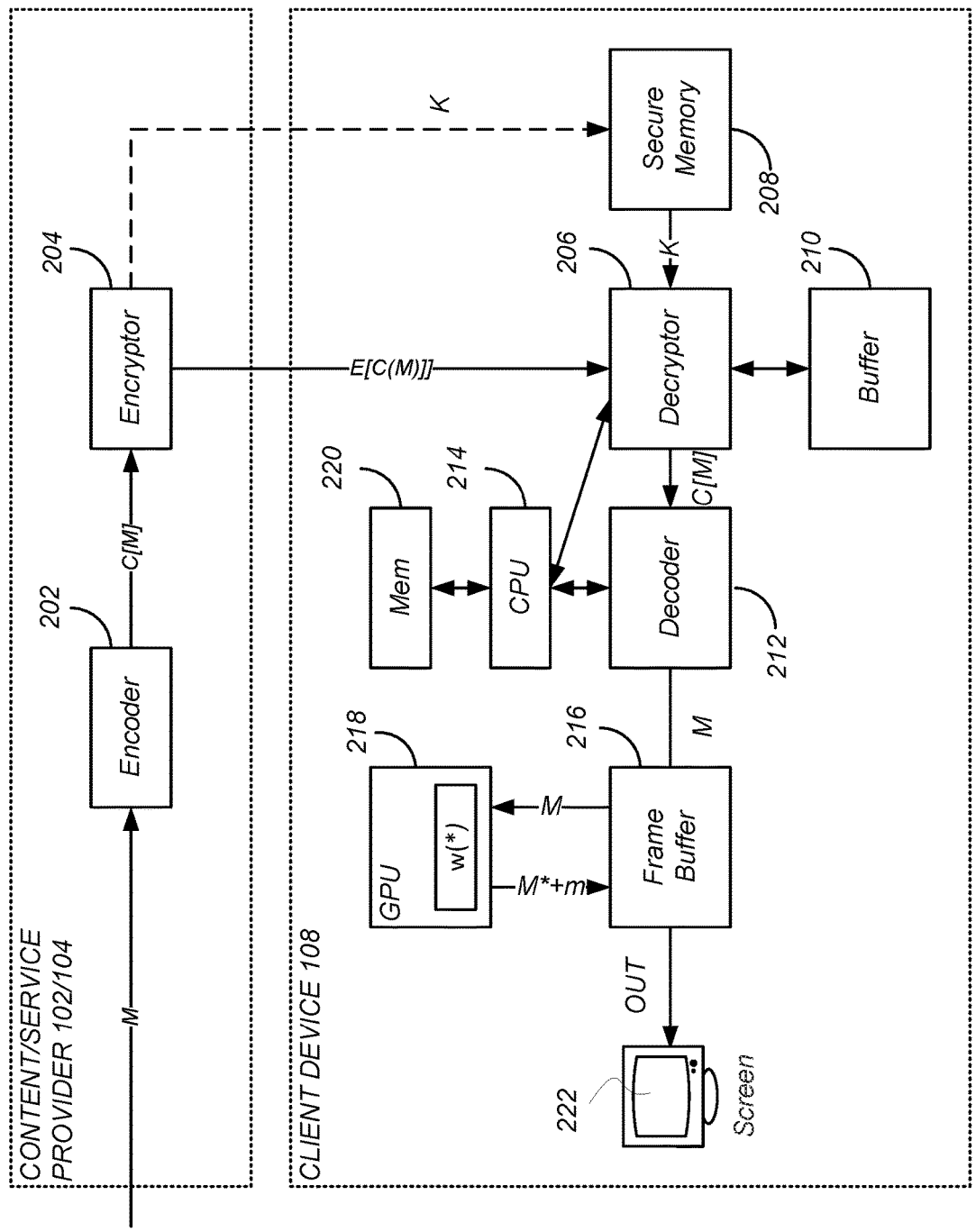
FIGS. 2A and 2B are diagrams illustrating further details of the content/service provider and the client device of the media program dissemination system.
Figure 2B:
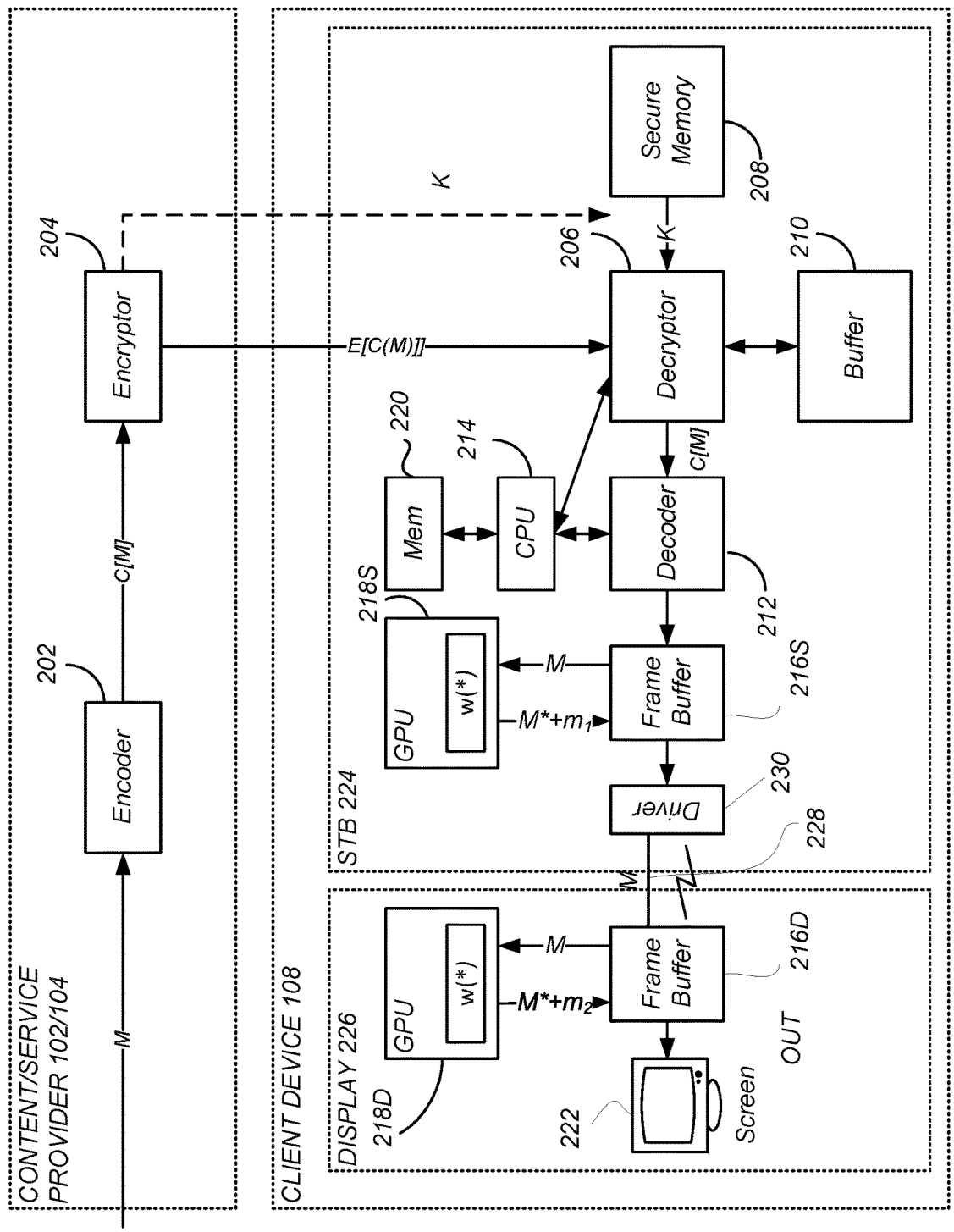

FIGS. 2A and 2B are diagrams illustrating further details of the content/service provider 102/104 and the client device 108. In the illustrated embodiment, the content/service provider 102/104 receives a digitized version of the media program (M). The digitized version of the media program M typically comprises of a plurality of frames, each frame representing an image that is to be presented in order one at a time, giving the appearance of motion. Typically, each frame comprises a plurality of pixels, organized in groups of blocks, with each pixel associated with a brightness and color value. In uncompressed form, a typical movie comprises 125 GB of data or more. As this is too large for economical storage or transmission, the media program M is encoded or compressed using spatial and temporal compression techniques using one or more encoders 202 to produce an encoded media program C[M]. Such encoding can be accomplished by use of a number of different encoding paradigms, including, for example, encoding according MPEG (motion pictures expert group), high efficiency video coding (HEVC), H.264 or similar coding scheme. The encoded version of the media program C[M] is then encrypted by encryptor 204 to produce an encrypted version of the media program E[C[M]], which is transmitted to the client device 108. Key(s) (K) needed to decrypt the media program are also provisioned to the client device 108 for storage in a secure memory 208. These keys may be provisioned by providing a physical device such as a smartcard or by transmission of the key via a communication link. This can occur before transmission of the media program, concurrently with the media program, or after the media program.

The client device 108 receives the encrypted and compressed media program and provides it to a decryptor 206, which decrypts the media program using one or more keys obtained from the communicatively coupled secure memory 208. In one embodiment, the decryptor 206 may comprise a special purpose processor custom designed to decrypt the media program under control of central processing unit (CPU) using instructions stored in memory 220. This may be implemented by a smartcard or other security device. In another embodiment, the decryptor 206 comprises a software or firmware module having instructions performed by the CPU 214 to decrypt the media program. Alternatively, the decryption operations may be performed by a combination of a special purpose processor and the CPU 214, with different operations being performed in each. To assure smooth production of decrypted media program, intermediate of final results of the decryption process may be stored in a memory buffer 210 communicatively coupled to the decryptor 206.

The decrypted (yet, still compressed) media program C[M] is provided to a decoder 212, which decompresses the compressed media program to produce the media program M. In one embodiment, the decoder 212 is a commercially available MPEG decoder operating under the control of the CPU 214 executing instructions stored in memory 220. In other embodiments, the CPU 214 itself may perform the decompression, using instructions stored in memory 220, or the both the CPU 214 and a special processor may both perform the decoding/decompression of the media program, with each performing different portions of the decoding process.

The resulting media program is provided to a frame buffer 216. A graphics processing unit 218 retrieves frames of the media program from the frame buffer 216 and processes them to overlay items to one of more of the frames, so that the user can be presented with menus for navigating the media program and selecting other functions of the client device. For example, if the user selects a control to increase the volume of the audio of the media program, the CPU 214 may direct the GPU 218 to overlay a graphic (m) on a plurality of frames that illustrates a sliding volume control. Other client device 108 functions or information may also be presented using overlay data added by the GPU 218. The GPU 218 may also alternatively watermark the media program and provide the watermarked media program (M*) to a screen 222 for display.

FIG. 2A illustrates an embodiment wherein the client device 108 comprises a television in which the screen 222 and elements 206-220 are integrated into a single device. This embodiment reflects, for example, instances of a television receiving media programs via digital broadcast television.

FIG. 2B illustrates an embodiment wherein the client device 108 comprises a set top box (STB) 224 and a display 226 communicating across a display interface 228. In this embodiment, the STB 224 communicates the media program M to a communicatively coupled display 226, where the media program is displayed. As illustrated, the STB 224 typically includes a frame buffer 216S and GPU 218S. The frame buffer 216S and GPU 218S can be used to insert STB-related on-screen displays (OSDs) $m_1$, and the like, and can be used to watermark the media program as well. In addition, the display 226 typically also comprises a frame buffer 216D and GPU 218S that can be used to insert display-related OSDs ($m_2$) for presentation on the screen 222 and for watermarking the media program. For example, and the GPU 218S of the STB 224 may provide OSDs related to digital video recorder (DVR) operation, electronic program guide (EPG) generation and display, while the GPU 218D of the display 226 may provide OSDs related to volume, or setting display characteristics such as contrast or color saturation.

The STB 224 communicates the media program over interface 228 which can be wired or wireless. The STB 224 comprises an interface driver 230 that accepts frames from the frame buffer 216S and formats the frames to comply with the protocol of the interface 228.

In one embodiment, the interface protocol is HDMI, and the driver 230 is an HDMI driver 230. The driver 230 may also implement an encryption capability, for example, High Bandwidth Digital Content Protection (HDCP). Wireless interfaces may be WiFi, Bluetooth (for lower resolution media), or any similar interface capable of transmitting the required information according to the relevant protocols. In other embodiments the media program M may be in analog form, and transmitted via coax cable.

The display 226 illustrated in FIG. 2B may include a display interface 228 analogous to that of the television embodiment of the client device 108 is presented in FIG. 2A. In this instance, the television may accept the media program M from the STB 224 or similar device via the display interface 228, yet still retain its own elements such as elements 206-214 and 220.

From the perspective of an individual attempting unauthorized access to the media program, the media program is in its most valuable form after it has been decrypted, and before it is decompressed (C[M]). That is because at that stage, the media program M is a reasonable size (since it remains compressed) suitable for storage and transmission, and is no longer encrypted. Because of its large size (multiple terabytes), the media program M in less desirable form as it emerges from the decoder 212, but still may be accessed on an unauthorized basis. Further, the frames of the media program M may be scraped from the frame buffer 216S or 216D. Although this would require the frames to be assembled (and presumably recompressed) before disseminating to others, the scraped frames would not be watermarked, and hence a clean (unwatermarked) copy of the media program may be obtained.

Figure 3:
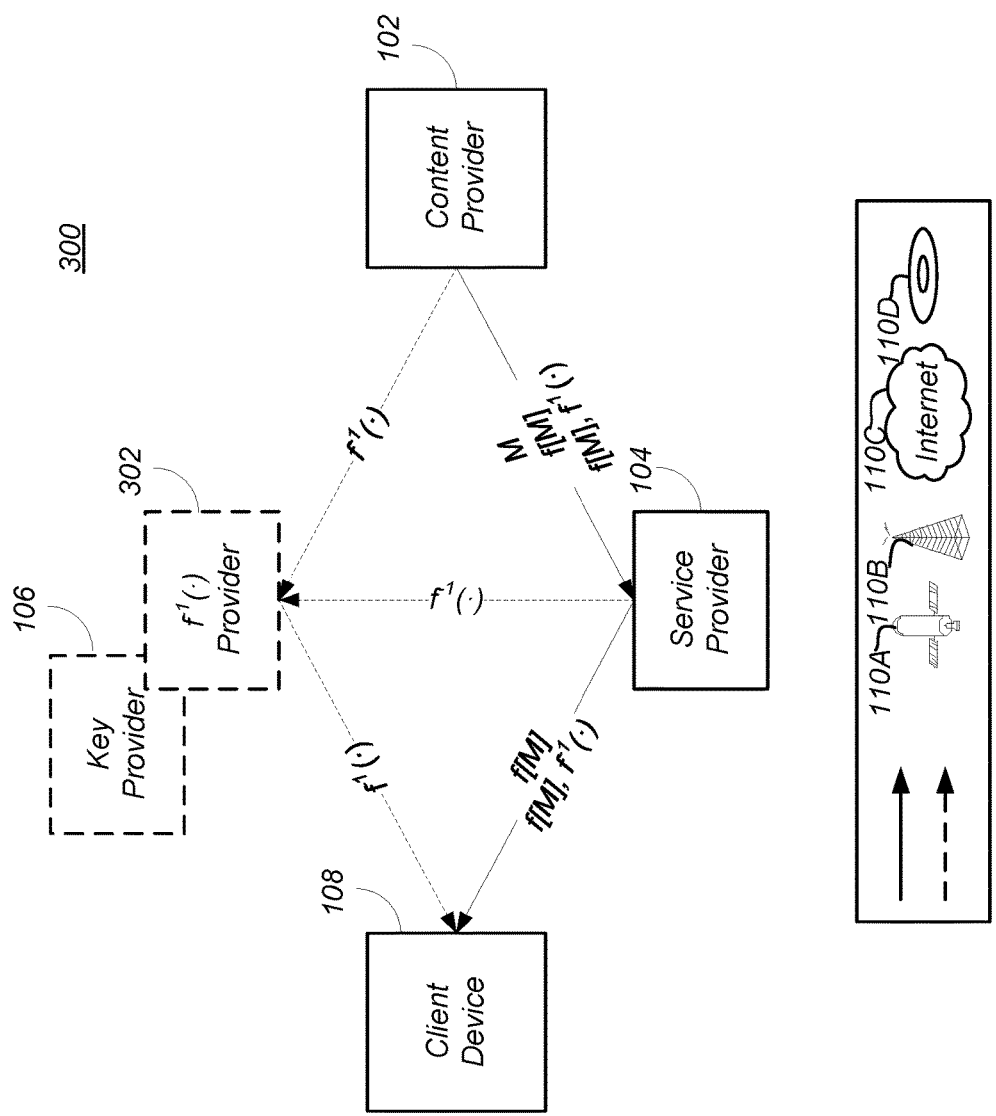
FIG. 3 is a diagram of an improved media program dissemination system.

FIG. 3 is a diagram of an improved MPDS 300. With the improved MPDS 300, the media program is corrupted before transmission to the client device 108 and complimentarily at least partially de-corrupted at the client device 108. This corruption and de-corruption can be performed on top of the usual encryption and decryption processes illustrated in FIGS. 1 and 2, and the media program may be corrupted by the content provider 102, service provider 104, or a combination of the content provider 102 and service provider 104. This permits, for example, the content provider 102 to independently protect the media program, either by preventing viewing of the media program or by watermarking the media program so that unauthorized viewing and/or copying can be detected and addressed.

As illustrated in FIG. 3, the media program M is corrupted by a corruption operation f to produce f[M]. The operation f may be a function in the mathematical sense (where each input has one and only one possible output), or it may be any operation and not so limited). The corruption operation renders the media program substantially unviewable by consumers, thus removing all significant value of the media program to unauthorized users/viewers. The corruption process may be so complete as to render the media program unrecognizable at all, or may simply make the media program unpleasant to view or listen to (e.g. with changing image or audio distortion) that a substantial or commercially significant number of viewers would find sufficiently objectionable to prevent them from viewing the media program. The corruption operation may be linear, or non-linear, and may be time variant or time-invariant.

The corruption operation f actually applied to the media program may be provided by a corruption operation provider 302. In one embodiment, the corruption operation provider 302 may be an independent entity from the content provider 102 or the service provider 104. In other embodiments, the corruption operation provider 302 is a part of the content provider 102 and/or the service provider 104. For example, the content provider 102 may want to independently protect their content, whether by preventing clear access, or by watermarking to identify unauthorized copies and their source. Accordingly, the content provider 102 may corrupt their media programs before providing them to the service provider 104 and independently provide means to the client device 108 to de-corrupt the media program. For example, as shown in FIG. 3, the content provider 102 may provide the media program M to the service provider 104, and an inverse operation $f^{-1}(\bullet)$ needed to de-corrupt the media program to corruption operation provider 302, and the corruption operation provider 302 may provide the inverse operation $f^{-1}(\bullet)$ to the client device 108 independent of the service provider 104. Similarly, in embodiments wherein the content provider 102 transmits an uncorrupted version of the media program M to the service provider and the corruption is performed by the service provider 104, the service provider 104 may provide the inverse operation $f^{-1}(\bullet)$ to the client device through corruption operation provider 302. This may be accomplished, for example, by using in-band or out-of-band transmission (e.g. a means for transmitting information independent from the transmission of the media program M itself).

In other embodiments, the content provider 102 provides both the corrupted version of the media program f[M] to the service provider 104 and independently provides the inverse operation $f^{-1}(\bullet)$ to the client device 108, for example, by a different communication path/means than the media program. Alternatively, the service provider 104 may provide the inverse operation $f^{-1}(\bullet)$ to the client device 108 by the same communication path/means (e.g. "in-band").

Figure 4A:
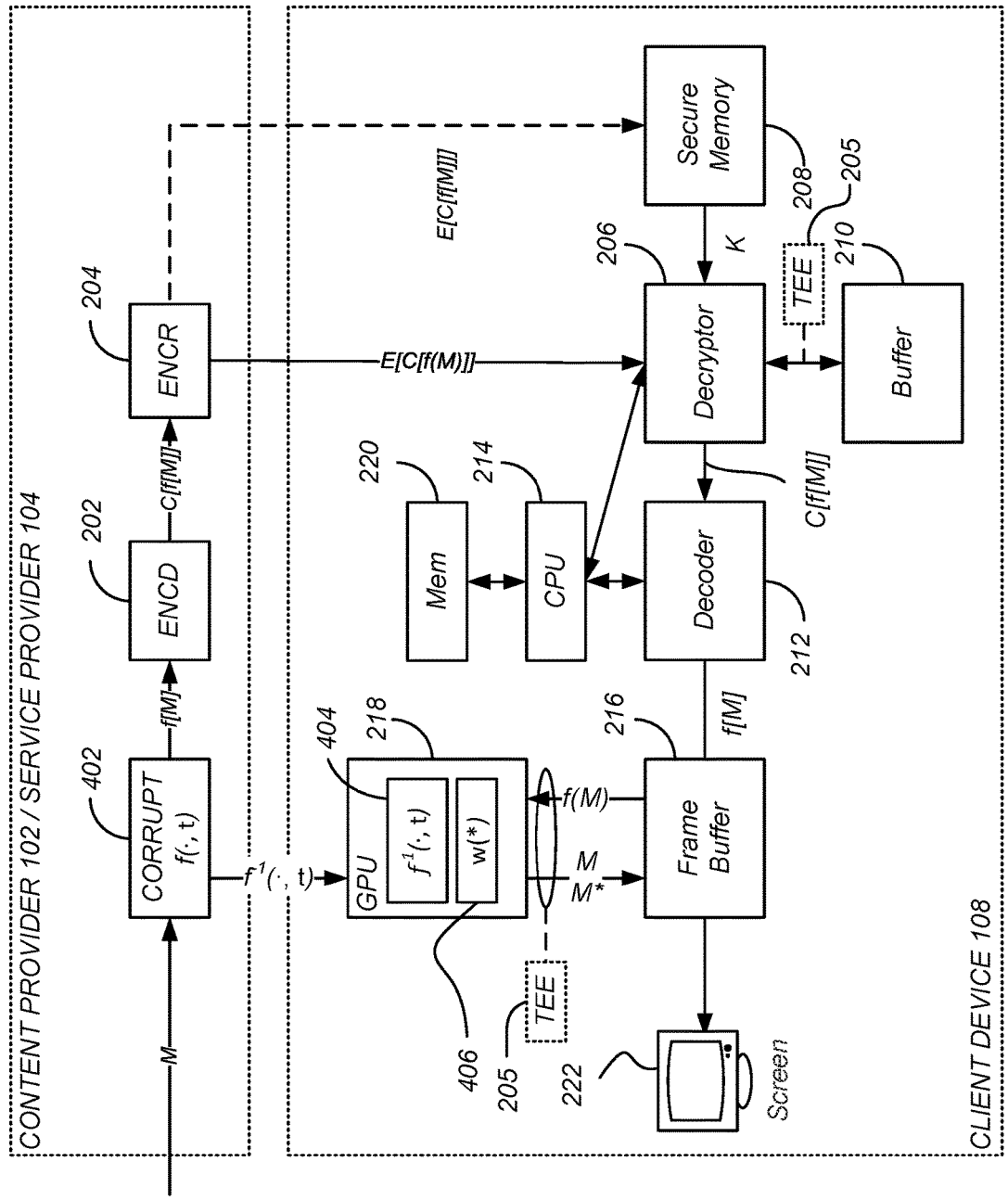
FIGS. 4A-4D are diagrams illustrating further details regarding elements of different embodiments of the media program dissemination system.

FIG. 4A is a diagram depicting a block diagram illustrating further details of the of the improved MPDS 300. In this embodiment, media program M is corrupted by a corruption device 402, and the client device 108 comprises an integrated television display. The corruption device 402 implements one or more corruption operations together represented by operation f. The operation f may be time invariant f(•) or may be time variant f(•,t). The corrupted media program f[M] is encoded by encoder 202. Encoding can comprise, for example, compression using well known techniques and standards such as MPEG or HEVC, as described previously. The result is an encoded version of the corrupted media program or C[f[M]]. Finally, the encoded corrupted media program C[f[M]] can be encrypted by an encryptor 204 to generate an encrypted, encoded, corrupted version of the media program E[C[f[M]]], which is provided to the client device 108. In one embodiment, the media program E[C[f[M]]] may be transmitted to the client device 108 by any of the methods illustrated in FIG. 3 including satellite 110A transmission, terrestrial 110B transmission, the Internet 110C or by physical device such as DVD 110D. The encrypted encoded corrupted media program E[C[f[M]]] is then decrypted by decryptor 206 (optionally, using buffer 210), and the result (the encoded corrupted media program C[f[M]] is provided to a decoder 212 which decodes the encoded corrupted media program C[f[M]] using CPU 214 executing instructions stored in memory 220 to produce the corrupted media program f[M], which is provided to a frame buffer 216 operated on by a GPU 218.

The GPU 218 receives the inverse corruption function ($f^{-1}(\bullet)$ or $f^{-1}(\bullet,t)$), and uses the inverse corruption function to decorrupt the frames, one at a time. Further, watermarking techniques (as further described below) may be employed to watermark the media program as a part of the decorruption process. In one embodiment, the GPU 218 is the same processor used to present on-screen displays to the user.

In the illustrated embodiment, the GPU 218 receives the inverse corruption function from the content provider 102/ service provider 104 via a different communication path than that which is used to transmit the encrypted, coded, and corrupted media program E[C[f[M]]]. For example, the media program E[C[f[M]]] may be broadcast by digital wireless transmission, while the inverse corruption function is transmitted via the Internet or analogous means. Such transmission may be accomplished using secure protocols such as secure hypertext transfer protocol (S-HTTP), transport layer security (TLS), IPSec, secure socket layer (SSL), secure shell (SSH), or analogous protocol to assure that the inverse corruption function is genuine and not compromised during transmission. In other embodiments, the GPU 218 may receive the inverse corruption function from the content provider by the same path that is used to transmit the media program.

In still further embodiments, the inverse corruption function itself is not transmitted to the client device 108. Rather, data from which the inverse corruption function can be derived by the client device 108 is transmitted. For example, the content provider 102/service provider 104 may transmit an index or other value from which the client device 108 may select from a plurality of pre-stored inverse corruption functions. In one example, the content provider 102/service provider transmits a number that selects from one of a plurality of stored inverse corruptions. In another example, the number comprises a plurality of digits, with each digit selecting one of a plurality of sub-inverse corruption functions, which when applied in the specified order, constitute the inverse corruption function. For example, the corruption function may comprise the application of functions $f_1$, $f_3$, $f_9$ and $f_2$ in that order, and the content provider 102/service provider 104 may transmit the value 2931 to the client device 108 indicating that inverse corruption functions $f_2^{-1}$, $f_9^{-1}$, $f_3^{-1}$, and $f_4^{-1}$ are to be applied in the indicated order. Further, value 2931 may be encrypted or otherwise protected as described above before transmission to the client device 108 or transmitted via a secure communication means.

The decryption and decorruption operations described above may be performed in a client device trusted execution environment 205. The characteristics of the trusted execution environment are analogous to those of the trusted execution environment of Such a TEE 407 environment may be implemented by the use of a "secure" processor running its own operating system and having its own memory that cannot be accessed (written to and/or read from) by the general processor used for non-secure operations. Alternatively, the TEE 407 environment may be implemented by use of a generic processor and "rich" operating system (OS), but with specific commands only permitted to run on a secure OS instead of the rich OS. This secure OS is smaller and more confined than the rich OS, and may for example (1) permitting only particular applications to be run by the secure OS, (2) restricting read and/or write operations to secure memory to only particular applications and only via the secure OS, or (3) permitting only a certain limited set of operations to be performed.

FIGS. 5A-5E are diagrams presenting exemplary operations that can be used to protect the media program.

Figure 5B:
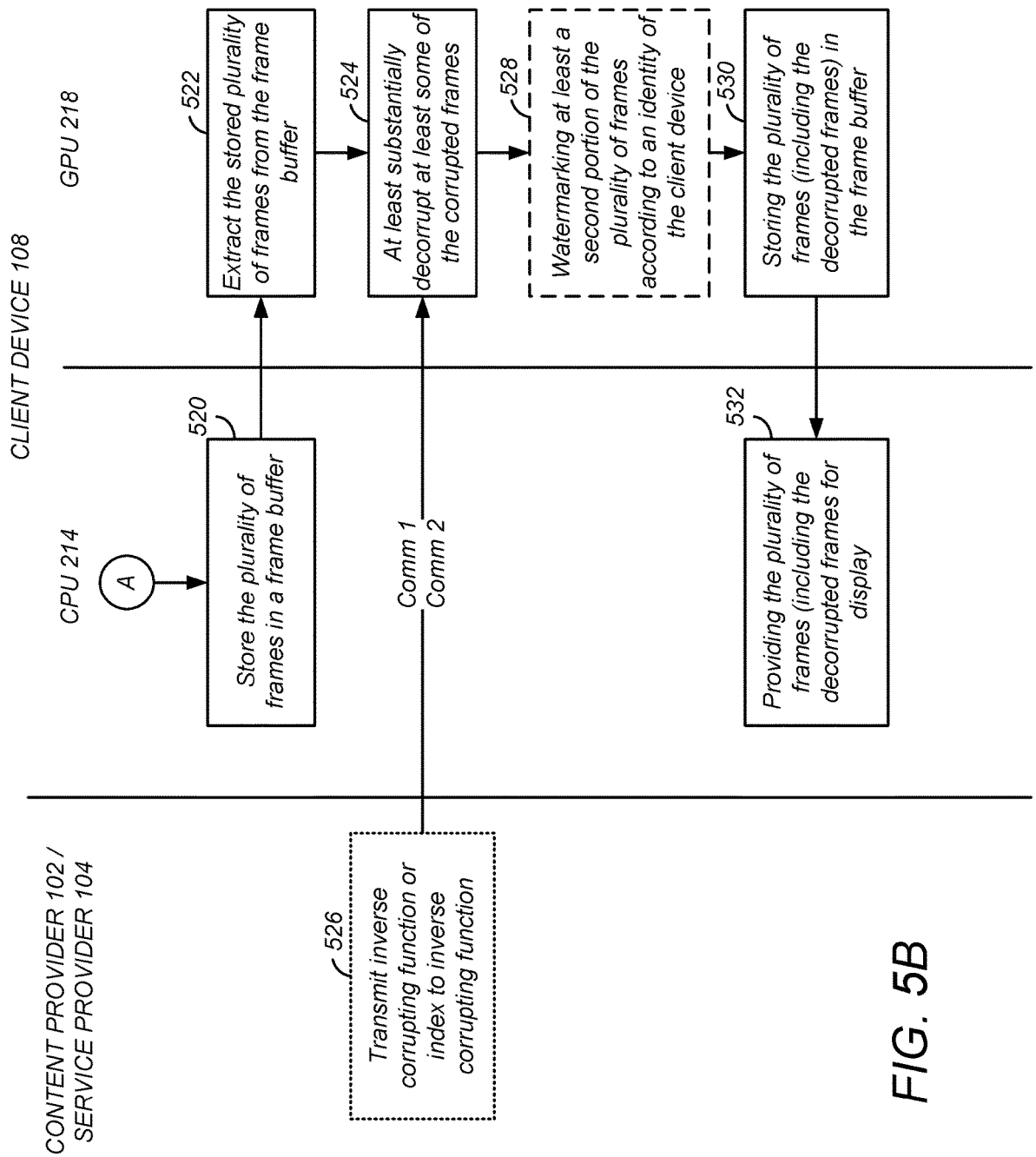

FIGS. 5A-5B are discussed with exemplary references to FIG. 4A, which is a diagram illustrating elements the improved MPDS 100.

In block 502, at least a portion of a plurality of frames of the media program M are corrupted. As described above, this operation may be performed by content provider 102, the service provider 104, or both entities (e.g. with a portion of the corruption operation(s) performed by the content provider 102 and the remaining portion(s) of the corruption operation(s) performed by the service provider 104.

In block 504, the at least partially corrupted media program f[M] is compressed. This can be accomplished via MPEG, HEVC, or similar compression techniques.

The corruption of the media program may render ordinary compression techniques less effective than is normally the case. For example, MPEG uses a wide variety of compression techniques including both spatial and temporal compression. Spatial compression involves compressing certain portions of a frame of a media program based upon the content of nearby or adjacent portions of the same frame. Temporal compression techniques compress video frames based upon differences between analogous portions of video between frames. For example, MPEG coded video includes intra coded frames (I frames), predictive coded frames (P frames) and bi-predictive coded frames (B frames). Intra-frame prediction exploits spatial redundancy, i.e. correlation among pixels within one frame, by calculating prediction values through extrapolation from already coded pixels for effective delta coding. It is one of the two classes of predictive coding methods in video coding. Its counterpart is inter-frame prediction which exploits temporal redundancy. Temporally independently coded so-called intra frames use only intra coding. The temporally coded predicted frames (e.g. MPEG's P- and B-frames) may use intra- as well as inter-frame prediction. For example, if there is no scene change, the content of a video frame is often not much different than the immediately previous frame. Predictive coding allows the content of the decoded frame to be determined as a difference between the frame to be decoded and the previous frame.

Corrupted video frames may contain more changes spatially within the same frame and also between frames. Accordingly, corruption operations may render the compression used by encoder less effective in reducing the size of the media program. In one embodiment, the corruption operations performed by corruption device 402 are chosen so as to minimize the impact on the compression operations performed by encoder 202. For example, most compression techniques involve splitting image frames into blocks and using redundancies between spatially or temporally adjacent blocks. The correlation operation(s) may be performed on only a subset of the blocks instead of every block in each frame. The result would be that only a portion of the decompressed image would be compromised, but that if that portion were well chosen (e.g. how many blocks and which blocks), the resulting image after decompression may be rendered visually difficult or irritating to see, thus significantly reducing the value of unauthorized copies of the media program. At the same time, limiting the corruption of the media program only to certain blocks (which may change over time) allows the compression algorithms of the encoder 202 to operate as efficiently or nearly as efficiently as they would otherwise operate without corruption. Further, the corruption function may be applied only to I-frames, which are larger than P-frames or B-frames, and hence, the corruption function may not substantially change the size (in bits or bytes) of the I frame. Further, since the decoding of P and B frames requires reference to the associated I frame, decoding of the P and B frames is unlikely to result in a viewable image.

Figure 4B:
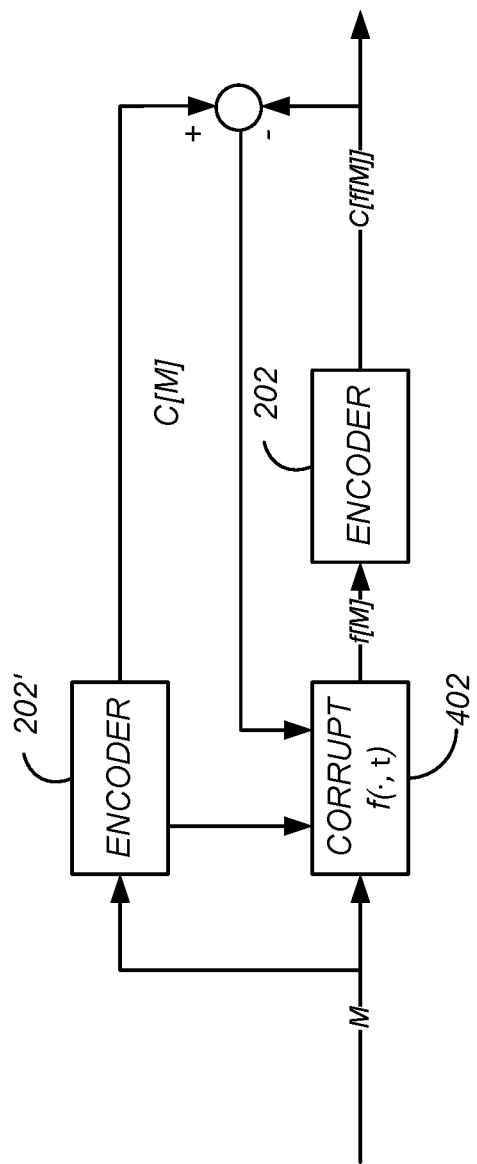

FIG. 4B is a diagram illustrating one embodiment of how the corruption function may be chosen. A second encoder 202' such as an MPEG encoder receives and encodes the uncorrupted media program M. As is known in the art, such encoders provide an encoded data stream C[M], but also can provide information regarding frame complexity, block choices, and other factors used in MPEG encoding. Such information is provided to the corruption device 402 to select which frames, blocks, and/or pixels are corrupted, and which operation(s) are used to perform such corruption. The difference between the non-corrupted and compressed media program C[M] and the corrupted compressed media program C[f[M]] may also be fed back to the corruption device 402 to further select the corruption operation(s) performed. For example, in one embodiment, the corruption device 402 changes the corruption operation(s) if the relevant portion of the corrupted and encoded media program C[f[M]] is unacceptably larger (e.g. in bytes) than the same relevant portion of the uncorrupted and encoded media program C[M]. In another embodiment, the coded uncorrupted media program (C[M]) is decoded and compared to decoded version of the coded and corrupted version of the media program C[f[M]] to assure that the corruption of the media program M is sufficient to render it unviewable (e.g. so corrupted as to render it commercially of substantially reduced value). Analogously, the decoder 212 of the client device 108 can be used to identify which frames are have been corrupted, and signal that information to the GPU 218.

Returning to FIG. 5A, the plurality of compressed (and corrupted) frames is encrypted, as shown in block 506. This can be performed by a variety of encryption techniques. The encrypted plurality of compressed frames of the media program M are then transmitted to the client device 108 on a first communication path, as shown in block 508. In block 510, the client device 108 receives the encrypted plurality of compressed (and corrupted) frames, and using the CPU 214, the client device 108 decrypts them, and decompresses them, as shown in blocks 512 and 514, respectively. This can be accomplished, for example, by the decryptor 206 and decoder 212 using CPU 214 and processor instructions stored in memory 220. While the illustrated embodiment shows a single CPU 214 performing both decryption and decoding operations, these operations may be performed by separate processors, which may each have a separate memory storing processor instructions used in the decryption and decoding processes. For example, the decryption process may be performed at least in part by a conditional access module within the client device 108, which may be implemented at least in part using a smartcard. Further, the decoder 212 may comprise a special purpose processor on a chip that performs the decoding process using a memory dedicated to that process.

Turning to FIG. 5B, processing is then routed to block 520, where the plurality of frames (now decrypted and decompressed) are stored in a frame buffer 216. The GPU 218 of the client device 108 then extracts the stored plurality of frames from the frame buffer 216 (block 522), and at least substantially decorrupts the frames that were corrupted by the corruption device 402, as shown in block 524. The GPU 218 uses information transmitted from the content provider 102, service provider 104, third party or combination of these entities to substantially decorrupt the frames extracted from the video frame buffer 216, as shown in block 526. In one embodiment, this information comprises the corrupting operation(s) itself. In other embodiments, this information comprises one or more decorrupting operation(s) $f^{-1}(\bullet,t)$ that substantially decorrupt the one or more frames. In still another embodiment, the operations needed to decorrupt the media program frames are stored in the GPU before the decorrupting operations (for example, by storing such operation(s) during manufacture of the client device 108 or by remotely transmitting the operation(s) to the client device 108 before they are required for decorrupting the media program frames).

Optionally, the plurality of frames or a portion thereof may be watermarked according to an identity of the client device 108, as shown in block 528. The (now at least substantially decorrupted and optionally watermarked) frames are stored in the frame buffer 216 (or a separate output frame buffer), as shown in block 530. This plurality of frames is then provided to the CPU 214 of the client device 108, which processes the frames for display on the screen 222, as shown in block 532.

The corruption of the media program may be performed on all of the frames of the media program or on only a portion of those frames, and the corruption operation(s) applied to some of the portion of the frames may be different than the corruption operation(s) applied to the other of the portion of the frames Further, the corruption of any individual frame may be applied to only a portion of the frame (e.g. a block) of the frame, multiple portions of the frame (e.g. multiple blocks), or the entire frame. Further, different corruption functions may be chosen for each of the corrupted portions of the frame.

Figure 4C:
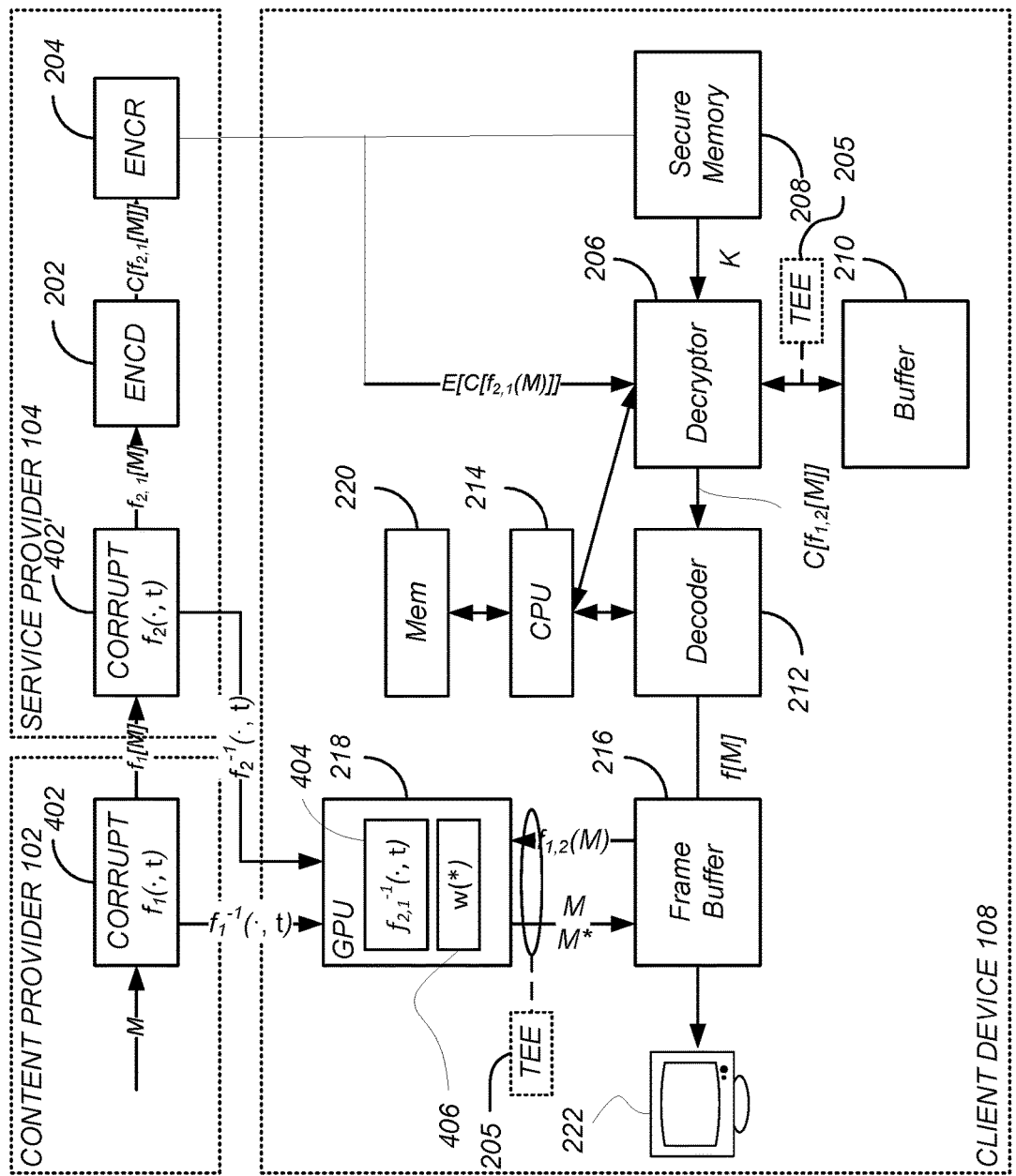

FIG. 5C is a diagram depicting exemplary operations that can be used to perform the corruption operation(s), described in block 502 of FIG. 5A. For exemplary purposes, this embodiment performs two corruption operations on at least a portion of at least a portion of the plurality of frames. FIG. 5C is discussed in connection with FIG. 4C which presents another embodiment of the elements of the improved MPDS 100 in which two corruption operations, one from the content provider 102 and one from the service provider 104 may be applied to the media program M.

The first such corruption operation (the depicted first corruption operation $f_1(\bullet,t)$ by the first corruption device 402 at a first entity such as the content provider 102) is performed in block 540. The resulting corrupted frames are transmitted to a second entity such as the service provider 104. The second such operation (the depicted second corruption operation $f_2(\bullet,t)$ of the second corruption device 402') is performed in block 542. The twice corrupted frames are then compressed, encrypted, and transmitted, as shown in blocks 504, 506 and 508 of FIG. 5A respectively.

With regard to this dual corruption embodiment, the first corruption operation $f_1(\bullet,t)$ may be applied to a subset of the media program frames and the second corruption operation $f_2(\bullet,t)$ applied to another subset of the media program frames. In another embodiment, the first corruption operation $f_1(\bullet,t)$ is applied to a first portion of one of the media program frames, and a second operation $f_2(\bullet,t)$ is applied to a second portion of the same media frame. In a still further embodiment, the first corruption operation $f_1(\bullet,t)$ is applied to a first portion of a first frame and the second corruption operation $f_2(\bullet,t)$ is applied to a second portion of the second frame. For example, the first corruption operation $f_1(\bullet,t)$ may be applied to an upper left block of the first frame and a second corruption operation $f_2(\bullet,t)$ may be applied to a lower left block of the second frame.

In a still further embodiment, the first and second corruption operations may be applied to the same frame or overlapping portions of different frames. For example, the first operation $f_1(\bullet,t)$ may be a hash of the first frame, and the second operation $f_2(\bullet,t)$ an exclusive or operation performed on the second frame. This embodiment permits the actual act of corrupting and/or the frame to be shared among more than one entity. For example, the content provider may perform a first corruption operation $f_1(\bullet,t)$ to at least a portion of at least a portion of the frames of the media program, and the service provider may perform a second corruption operation $f_2(\bullet,t)$ to the same portions of the same frames of the media program, or on other portions or other frames.

Recovery of the media program for viewing requires that the client device 108 have access to both decrupting operations. This allows the content provider 102 to corrupt their content to make it substantially unviewable independent of the service provider 104 or vice versa. Decorrupting operations taking place in the client device 108 may use the same GPU 218 for both decryption operations, and even the same software module 404 of the GPU 218. Alternatively, separate software modules may be employed.

Further, signaling of the decorruption operations may be performed separately by the content provider 102 and the service provider 104, taking separate (or the same) communication paths. For example, the content provider can signal (or provide) the first decorrupting operation(s) $f_1^{-1}(\bullet,t)$ to the client device 108, and the service provider 104 may provide the second decorrupting operation(s) $f_2^{-1}(\bullet,t)$ to the client device. Further, either decorrupting operation or index to such operation may be transmitted by either the content provider 102 or the service provider 104 in-band (the same communication path as the media program itself) or out of band. For example, in FIG. 4C, the first decorruption operation(s) $f_1^{-1}(\bullet,t)$ is provided to the client device 108 from the content provider 102 via a different communication path than the media program, and a different path than the second decorruption operation(s) $f_2^{-1}(\bullet,t)$ provided by the service provider 104. In another example, an index to the first corruption operation(s) $f_1^{-1}(\bullet,t)$ and the second corruption operation $f_2^{-1}(\bullet,t)$ can be transmitted in the same path as the media program, perhaps incorporated into the media program data stream itself. In still further embodiments, the decorruption operation(s) themselves are transmitted client device 108 in encrypted form (using the same encryptor 204 and decryptor 206 used to encrypt and decrypt the media program or a different encryptor and decryptor (not illustrated).

Which frames and/or blocks are selected can be determined on parameters of the frames or blocks themselves. For example, the applied corruption operation may be determined according (1) the storage size of the frame or block (in bits or bytes), (2) the physical size or dimension of the pixels of the frame or block, an amount of (3) luminance, (4) color or hue or similar parameter that can be recovered by the client device when performing the decorrupting operation. For example, frames over a storage size of 500 Kbytes may receive a first corruption operation, with frames under that storage size may receive a second corruption operation. Which size frame requires which decorrupting operation may be according to a predetermined set of rules, or may be signaled to the client device 108 either in-band (along with the media program) or out of band (e.g. using a communication path independent from that used to transmit the media program).

The plurality of encoded, encrypted, corrupted frames of the media program $E[C[f_{2,1}[M]]]$ are received in the client device 108, where they are decrypted, decompressed, and stored in the frame buffer 216 as shown in blocks 510, 512, and 514 of FIG. 5A, respectively.

Figure 5D:
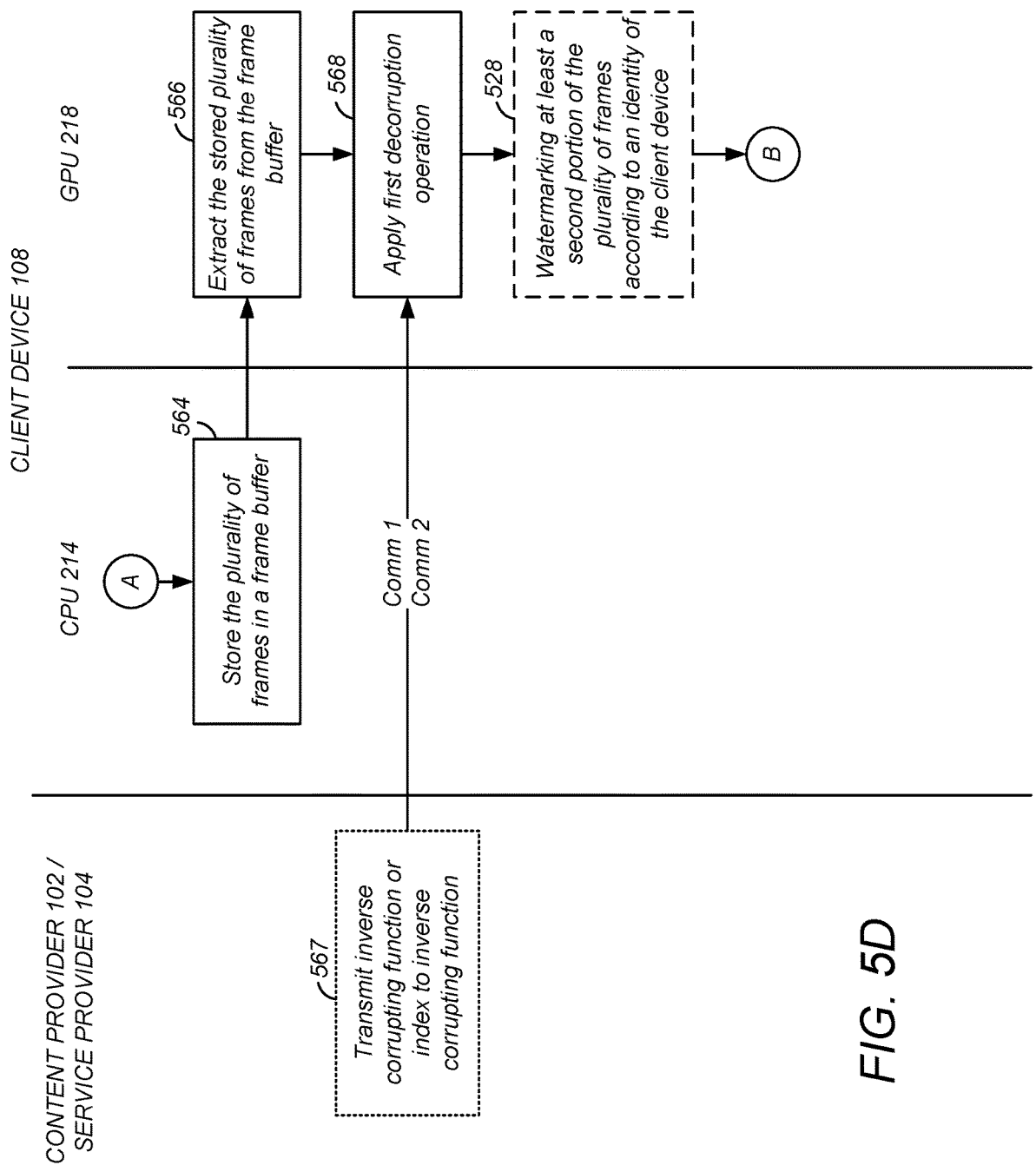
Figure 5E:
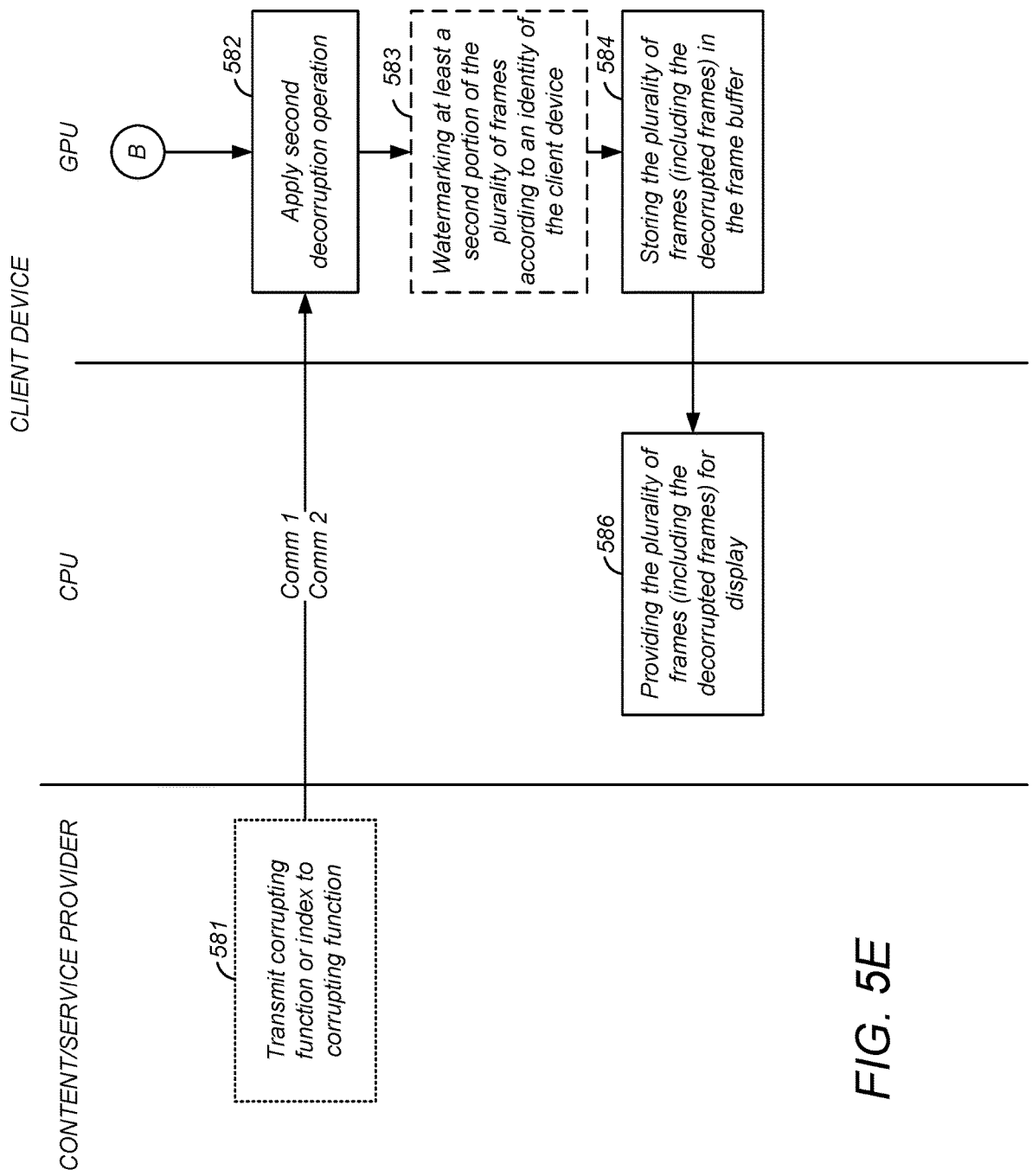

FIGS. 5D-5E are diagrams illustrating the decorruption of the decrypted and decompressed (decoded) frames. In block 564, the plurality of frames are stored in the frame buffer 216. In block 566, a GPU 218 extracts the stored plurality of frames from the frame buffer 216 and applies a first decorruption operation to remove the effects of the second corruption operation of block 542, as shown in block 568. This can be accomplished, for example with the decorruption operation transmitted by the content provider 102, service provider 104 or another entity, as shown in block 567. At this point, a first watermarking operation can be performed, as shown in block 528.

Turning to FIG. 5E, the GPU 218 then applies another decorruption operation transmitted in block 581 to remove the effects of the first (inner) corruption operation performed in block 540 and stores the plurality of frames in the frame buffer, as shown in blocks 582 and 584. Again, an optional second watermarking operation can be performed, as shown in block 583. Finally, as shown in block 586, the plurality of frames is provided for display.

As illustrated, the GPU 218 performs both decorruption operations, but this need not be the case, as the GPU 218 may perform only one of the decorruption operations. Further, the different processors can be used to perform different decorruption operations.

As described above, the decorruption operations are configured to watermark at least a portion of the media program. This embodiment is highly advantageous as watermarking operations may already be supported in the GPUs 218, making the addition of the decorruption operations described above to be easy to implement without substantial modification to the client device 108 (e.g. they may be accomplished via firmware or software changes alone).

Hence, in such an embodiment, the watermarking is performed by watermarking module 406 that works in conjunction with the decorruption module 404 of the client device 108. In an exemplary example, the client device 108 incompletely decorrupts the at least the portion of the at least some of the frames, and this incomplete decorruption is performed according to an identity of the client device 108, thus allowing the client device 108 to be identified. This process incorporates watermarking techniques into the decorruption operations, and makes only watermarked copies of the media program to be produced by the client device.

For example, in one embodiment, one or more of the decorruption operation(s) use a client device 108 identifier. As one example, each of the frames may comprise a plurality of blocks, with each of the blocks having a plurality of pixels. A hash, exclusive OR, or other cryptographic operation of the client device 108 identifier can be used to identify frames or blocks of frames that are to be left in the corrupted state (or removed from the corrupted state). Or, the client device 108 identifier or hash of the client device 108 identifier could be used as a seed to random number generator that determines which frames or portions of the frames will be decorrupted.

Embodiments are also supported that permit independent watermarking by the content provider 102 and the service provider 104. For example, the GPU 218 may watermark the media program by selecting which frames or portions of frames to decorrupt using both the first decorruption operation $f_1^{-1}(\bullet,t)$ and the second decorruption operation $f_2^{-1}(\bullet,t)$.

Figure 4D:
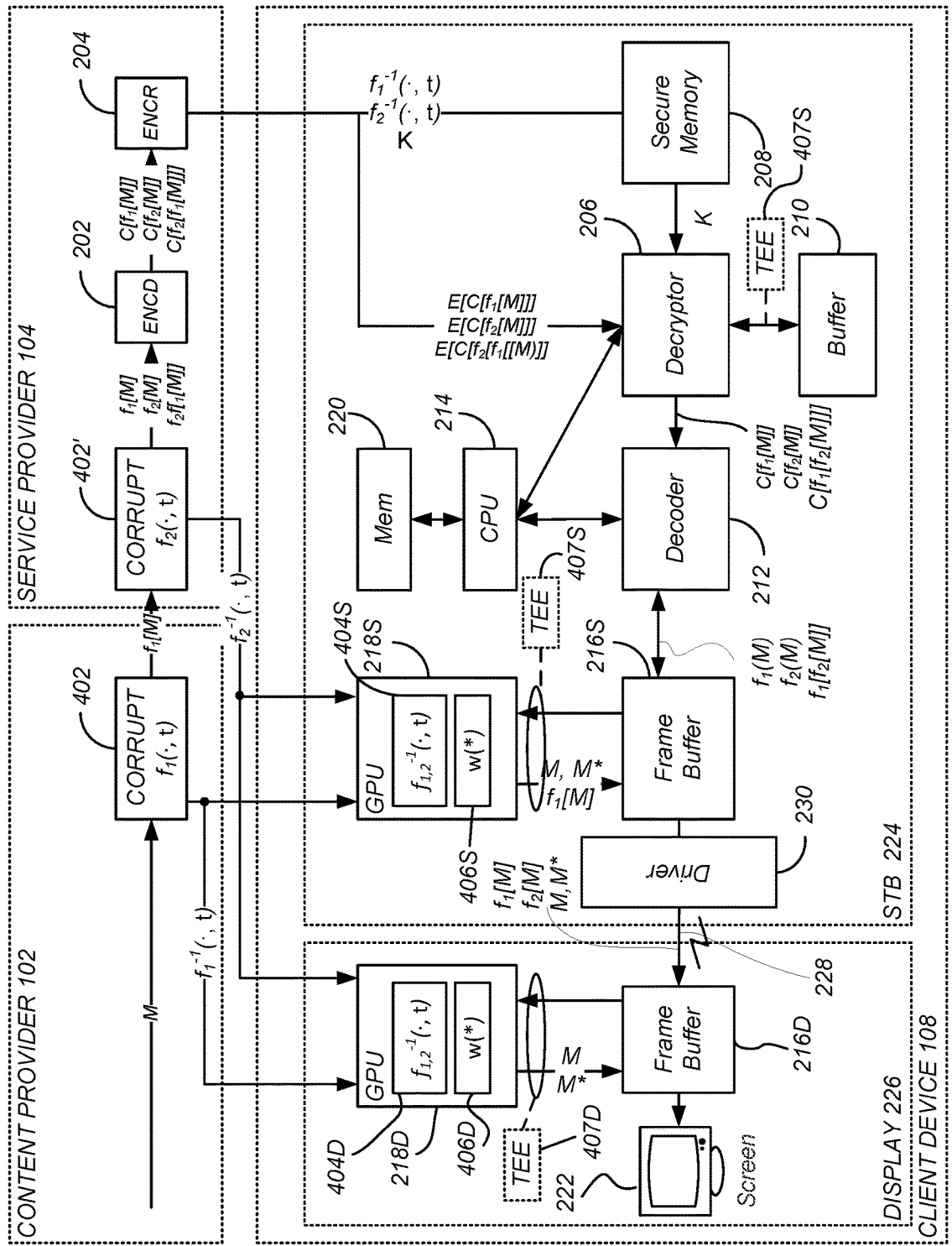

FIG. 4D is a diagram illustrating several embodiments of the elements of the improved MPDS 100. These embodiments reflect that the client device 108 may comprise the STB 224 that receives the media program and provides the received media program to a display 226 for presentation, that the corruption/decorruption operation may include one or more decorruption/corruption operations (as described in in FIG. 4C), with the decorruption operation(s) being performed in either the STB 224, the display 226 or both.

In a first embodiment, the media program is corrupted only by corruption function $f_1(\bullet)$ (or $f_1(\bullet,t)$) by a first corruption device 402 of the content provider 102 to produce $f_1[M]$. The media program can be decorrupted by the inverse or decorruption function $f_1^{-1}(\bullet)$ using the GPU 218S of the STB 224 by or by the GPU 218D of the display 226.

In a second embodiment, the media program is corrupted only by corruption function $f_2(\bullet)$ (or $f_2(\bullet,t)$) by a second corruption device 402' of the service provider 104 to produce $f_2[M]$. The media program can be decorrupted by the inverse or decorruption function $f_2^{-1}(\bullet)$ (or $f_2^{-1}(\bullet,t)$) using the GPU 218S of the STB 224 by or by the GPU 218D of the display 226.

In a third embodiment, the media program is corrupted by corruption function $f_1(\bullet)$ (or $f_1(\bullet,t)$) and the resulting corrupted media program is further corrupted by corruption function $f_2(\bullet)$ (or $f_2(\bullet,t)$) to produce $f_2[f_1[M]]$. The media program can be decorrupted by the GPU 218S of the STB 224 by use of the second decorruption function $f_2^{-1}(\bullet,t)$, thus regenerating the corrupted media program $f_1[M]$, then further decorrupted by use of the first decorruption function $f_1^{-1}(\bullet,t)$ by the GPU 218D of the display 226 to regenerate the uncorrupted media program [M].

First Embodiment

Referring now to the first embodiment, the media program M is corrupted at the content provider 102 by corruption function $f_1(\bullet,t)$ using corruption device 402 to produce the corrupted media program $f_1[M]$, which is provided to the service provider 104. As described above, the corrupted media program M may also be encoded and or encrypted before provision to the service provider, and suitably decrypted and decoded.

The corrupted media program $f_1[M]$ is then encoded by encoder 202 to produce encoded corrupted media program $C[f_1[M]]$. The encoded corrupted media program $C[f_1[M]]$ is then encrypted according to a key K to produce an encrypted version of the encoded corrupted media program $E[C[f_1[M]]]$, which is provided to the STB 224. The STB 224 receives and decrypts the encrypted version of the encoded corrupted media program $E[C[f_1[M]]]$ using decryptor 206, buffer 210, CPU 214 and memory 220 to produce the encoded corrupted media program $E[C[f_1[M]]]$. In one embodiment, this is accomplished in a trusted execution environment (TEE) of the STB 224 as further described below.

The encryption and decryption of the media program can be accomplished by a number of different techniques, including encryption and decryption according to a secret such as a key K, which can be provided via the same communications path as the media program, or by another communication path.

The encoded corrupted media program $E[C[f_1[M]]]$ is then provided to decoder 212 for decoding to produce the corrupted media program $f_1[M]$. At this point, the corrupted media program $f_1[M]$ is unviewable, and must be decorrupted by either the display 226 of further elements of the STB 224.

In one sub-embodiment, the corrupted media program $f_1[M]$ is decorrupted by the STB 224 with $f_1^{-1}(\bullet,t)$ the GPU 218S retrieving frames from the frame buffer 216S, applying the inverse corrupting operation $f_1^{-1}(\bullet,t)$ and providing the decorrupted media program M to the display 226 via interface driver 230 and interface 228. The inverse corrupting function $f_1^{-1}(\bullet,t)$ may have been obtained directly from the content provider 102 via a different communication path than the media program itself, or may have been provided using the same communication path (even in the same data stream as the media program) and stored in secure memory 208 for retrieval by the GPU 218S and use. The decorrupted media program is then provided to the interface driver 230 and thence to the display 226 for display. As the media program is already decorrupted, the display need not further decorrupt the media program. In this embodiment, it is possible to retrieve the media program without corruption at the interface 228. This problem can be ameliorated if the driver 230 implements an encryption scheme to encrypt the media program before providing it to the display 226 and the display 226 later decrypts the media program.

In a second sub-embodiment, the media program $f_1[M]$ is provided over the interface 228 in corrupted form and is decorrupted in the display 226 by the GPU 218D retrieving frames from the frame buffer 216D, applying the inverse corrupting function $f_1^{-1}(\bullet,t)$ and providing the decorrupted media program M to the screen 222 via the frame buffer 216D. The inverse corrupting function $f_1^{-1}(\bullet,t)$ may have been obtained directly from the content provider 102 via a different communication path than the media program itself, or may have been provided using the same communication path (even in the same data stream as the media program), stored in secure memory 208 for retrieval by the GPU 218S via interface 228 and use. In this embodiment, the media program cannot be retrieved in uncorrupted form at the interface 228. Hence, the media program is protected, even if the driver 230 does not implement an encryption scheme to encrypt the media program before providing it to the display 226 where it is later decrypted. However, the corrupted media program $f_1[M]$ may be encrypted as well for additional protection.

In a third sub-embodiment, the media program M is corrupted by the content provider 102, but transmitted directly to the STB 224 or analogous device rather than being transmitted via a service provider. Such an analogous device may include a computer receiving the media program directly from the content provider 102 via the Internet, similar device such as an integrated television. In such case, the content provider 102 typically encrypts the media program M after the corruption process before transmitting the encrypted corrupted media program to the STB 224, and the STB 224 decrypts the encrypted and corrupted media program before the decorrupting process begins.

Second Embodiment

Referring now to the second embodiment, the media program M is provided to the service provider, and the service provider 104 corrupts the media program by corruption function $f_1(\bullet,t)$ using corruption device 402' to produce the corrupted media program $f_2[M]$. As described above, the corrupted media program M may also be encoded and or encrypted before provision to the service provider, and suitably decrypted and decoded before the corruption process.

The corrupted media program $f_2[M]$ is then encoded by encoder 202 to produce encoded corrupted media program $C[f_2[M]]$. The encoded corrupted media program $C[f_2[M]]$ is then encrypted (for example, according to a key K) to produce an encrypted version of the encoded corrupted media program $E[C[f_2[M]]]$, which is provided to the STB 224. The STB 224 receives and decrypts the encrypted version of the encoded corrupted media program $E[C[f_2[M]]]$ using decryptor 206, buffer 210, CPU 214 and memory 220 to produce the encoded corrupted media program $E[C[f_1[M]]]$. In one embodiment, this is accomplished in a trusted execution environment (TEE) of the STB 224 as further described below.

The encoded corrupted media program $E[C[f_2[M]]]$ is then provided to decoder 212 for decoding to produce the corrupted media program $f_2[M]$. At this point, the corrupted media program $f_2[M]$ is unviewable, and must be decorrupted by either the display 226 of further elements of the STB 224.

In one sub-embodiment, the corrupted media program $f_2[M]$ is decorrupted by the STB 224 with $f_2^{-1}(\bullet,t)$ the GPU 218S retrieving frames from the frame buffer 216S, applying the inverse corrupting operation $f_2^{-1}(\bullet,t)$ and providing the decorrupted media program M to the display 226 via interface driver 230 and interface 228. The inverse corrupting function $f_2^{-1}(\bullet,t)$ may have been obtained directly from the service provider 104 via a different communication path than the media program itself, or may have been provided using the same communication path (even in the same data stream as the media program) and stored in secure memory 208 for retrieval by the GPU 218S and use. The decorrupted media program is then provided to the interface driver 230 and thence to the display 226 for presentation on the screen 222. As the media program M is already decorrupted, the display 226 need not further decorrupt the media program. In this embodiment, it is possible to retrieve the media program without corruption at the interface 228. This problem can be ameliorated if the interface driver 230 implements an encryption scheme to encrypt the media program before providing it to the display 226 and the display 226 later decrypts the media program.

In a second sub-embodiment, the media program $f_2[M]$ is provided over the interface 228 in corrupted form and is decorrupted in the display 226 by the GPU 218D retrieving frames from the frame buffer 216D, applying the inverse corrupting function $f_2^{-1}(\bullet,t)$ and providing the decorrupted media program M to the screen 222 via the frame buffer 216D. The inverse corrupting function $f_2^{-1}(\bullet,t)$ may have been obtained directly from the service provider 104 via a different communication path than the media program itself, or may have been provided using the same communication path (even in the same data stream as the media program), stored in secure memory 208 for retrieval by the GPU 218S via interface 228 and use. In this embodiment, the media program cannot be retrieved in uncorrupted form at the interface 228. Hence, the media program is protected, even if the driver 230 does not implement an encryption scheme to encrypt the media program before providing it to the display 226 where it is later decrypted. However, the corrupted media program $f_2[M]$ may be encrypted as well for additional protection.

Third Embodiment

Referring now to the third embodiment, the media program M is first corrupted by corruption function $f_1(\bullet)$ (or $f_1(\bullet,t)$) using corrupting device 402, and transmitted to the service provider 104. As described above, before such transmission, the corrupted media program $f_1[M]$ may also be encoded and or encrypted before provision to the service provider 104, and suitably decrypted and decoded by the service provider 104. The resulting corrupted media program $f_1[M]$ is further corrupted by corruption function $f_2(\bullet)$ (or $f_2(\bullet,t)$) using corrupting device 402' to produce further corrupted media program $f_2[f_1[M]]$. Hence, the media program M is corrupted by both the content provider 102 and the service provider 104.

The further corrupted media program $f_2[f_1[M]]$ is then encoded by encoder 202 to produce encoded corrupted media program $C[f_2[f_1[M]]]$. The encoded further corrupted media program $C[f_2[f_1[M]]]$ is then encrypted according to a key K or other encryption technique by encryptor 204 to produce an encrypted version of the encoded further corrupted media program $E[C[f_2[f_1[M]]]]$, which is provided to the STB 224. The STB 224 receives and decrypts the encrypted version of the encoded corrupted media program $E[C[f_2[f_1[M]]]]$ using decryptor 206, buffer 210, CPU 214 and memory 220 to produce the encoded corrupted media program $C[f_2[f_1[M]]]$. In one embodiment, this is accomplished in a trusted execution environment (TEE) of the STB 224 as further described below.

The encoded corrupted media program $C[f_2[f_1[M]]]$ can be decorrupted by the GPU 218S of the STB 224 by use of the second decorruption function $f_2^{-1}(\bullet,t)$, thus regenerating the corrupted media program $f_1[M]$, using techniques analogous to those described above. The corrupted media program $f_1[M]$ may be watermarked before provision to the display 226 using the techniques described above, for example, using an identifier of the STB 224. This allows the service provider 104 to later determine which STB 224 performed the decorrupting function.

The decorrupting (or inverse corrupting) function $f_2^{-1}(\bullet,t)$ may have been obtained directly from the service provider 104 via a different communication path than the media program itself, or may have been provided using the same communication path (even in the same data stream) as the media program, and stored in secure memory 208 for retrieval and use by the GPU 218S via interface 228. This process may also be accomplished in the TEE 407 of the STB 224.

The corrupted media program $f_1[M]$ is then provided to the interface driver 230, which formats and configures the corrupted media program $f_1[M]$ for transmission to the display 226. As described above, this corrupted media program $f_1[M]$ may be encrypted before transmission to the display 226, but this is not necessary, because at this point, the corrupted media program $f_1[M]$ is at least substantially unviewable, and must be decorrupted by the display 226.

The corrupted media program $f_1[M]$ is provided over the interface 228 and is decorrupted in the display 226 by the GPU 218D retrieving frames from the frame buffer 216D, applying the inverse corrupting function $f_1^{-1}(\bullet,t)$ and providing the decorrupted media program M to the screen 222 via the frame buffer 216D. The media program M may also be watermarked during the decorruption process, using the techniques described above. As this watermark is associated with the first decorruption function $f_1^{-1}(\bullet,t)$, the watermark may later be used by the content provider 102 to identify the display 226 that was used to decorrupt the media program. Preferably, this watermarking is performed in a way that preserves the watermarks inserted by the STB 224. For example, the decorruption process implemented by the STB 224 may result in a corrupted media program $f_1[M]$ having particular frames and blocks that are not completely decorrupted, and the decorruption process implemented by the display 226 may result in the decorrupted media program M having particular frames and blocks that are not completely decorrupted, and which differ from those of the incompletely decorrupted blocks in the corrupted media program $f_1[M]$.

The decorrupting (or inverse corrupting) function $f_1^{-1}(\bullet,t)$ may have been obtained directly from the content provider 102 via a different communication path than the media program itself, or may have been provided using the same communication path (even in the same data stream) as the media program, stored in secure memory 208 for retrieval and use by the GPU 218D via interface 228.

In the foregoing embodiments, the inverse corrupting functions $f_1^{-1}(\bullet,t)$, and/or $f_2^{-1}(\bullet,t)$ (or information used to derive or select the inverse corrupting functions $f_1^{-1}(\bullet,t)$, and/or $f_2^{-1}(\bullet,t)$) may be transmitted via the display interface 228, which is useful in embodiments where the inverse corrupting function(s) $f_1^{-1}(\bullet,t)$, and/or $f_2^{-1}(\bullet,t)$ are transmitted via the same communication path or means as the media program itself.

Critical operations may be performed in a trusted execution environment (TEE). For example, the STB 224 includes a first TEE 402S and the display 226 includes a second TEE 407D. In the following discussion, the TEE 402S and TEE 407D are alternatively collectively referred to as TEE 407.

GPU 218S and 218D (hereinafter alternatively referred to as GPU 218), CPUs 214 and/or decryptor 206 operations may be performed in the trusted execution environment (TEE) 407 of the associated device. For example, applications executing in the GPU 218S that read the frame buffer 216S, write to the frame buffer 216S and perform the decorruption functions are preferably performed in the TEE 402S associated with the STB 224. Similarly, applications executing in the GPU 218D that read the frame buffer 216D, write to the frame buffer 216D and perform the decorruption functions are preferably performed in the TEE 407D associated with the display 226.

For example, the application running in the GPU 218 that performs the decorruption operations may be a trusted application requiring a hardware root of trust environment that will execute with the trusted OS, but not the rich OS. This trusted application executes in the secure OS, and the secure OS may permit the trusted application (using the generic CPU of the GPU 218) to both read data from the memory designated as secure (e.g. the frame buffer 216) and write data to the frame buffer 216, while other applications operating with the rich OS are denied either reading from or writing to the frame buffer 216, or denied access to the secure memory altogether. Analogous functionality may be available by virtue of a TEE 402S associated with the decryptor 206 in using buffer 210, and may also be available with respect to the CPU 214.

Hardware Environment

Figure 6:
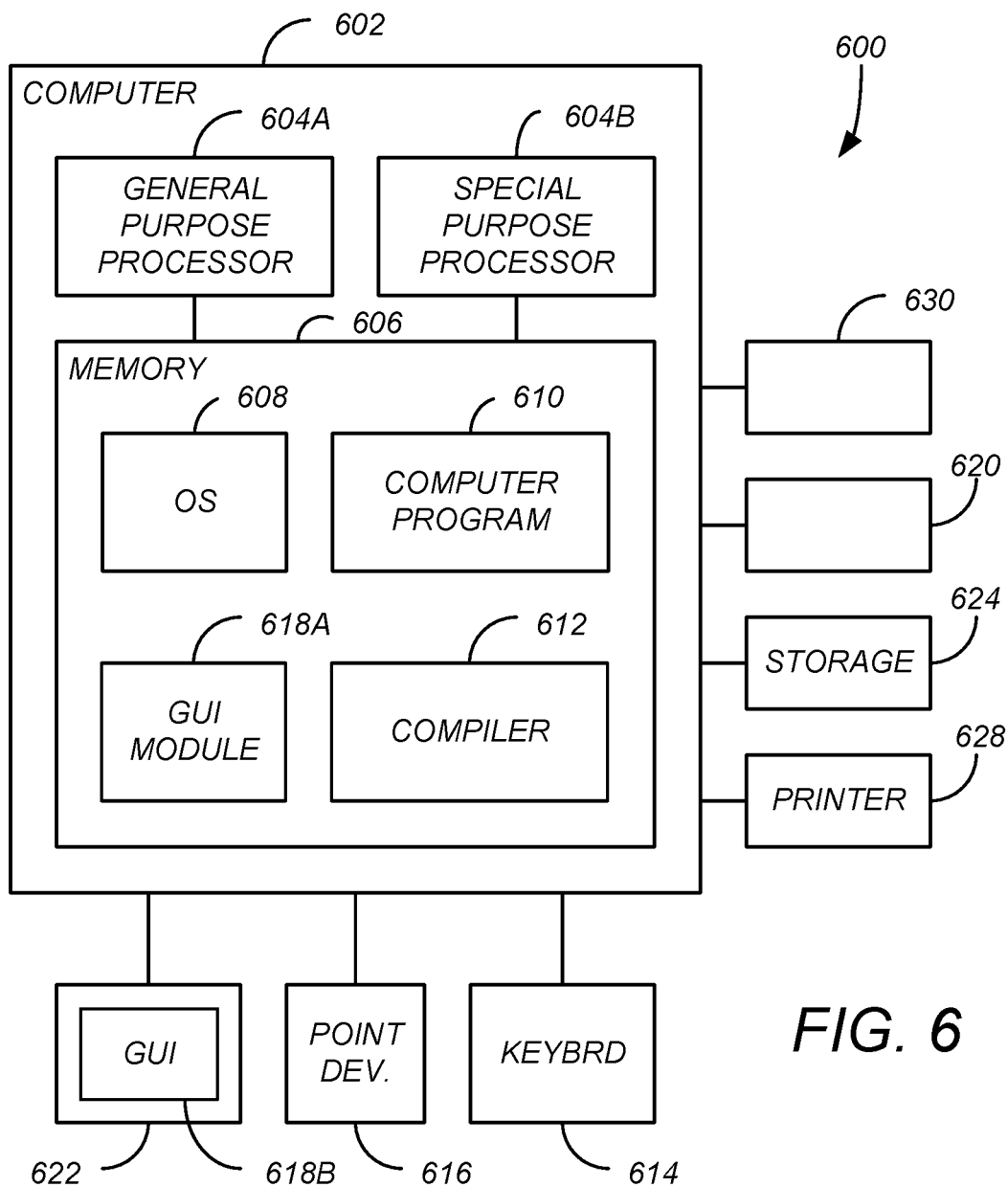
FIG. 6 is a diagram illustrating an exemplary processing system usable to implement processing elements of the above systems.

FIG. 6 illustrates an exemplary computer system 600 that could be used to implement processing elements of the above disclosure, including the client device 108 and elements of the content provider 102 and service provider 104. The computer 602 comprises one or more processors such as general purpose processor 604A and/or special purpose processor 604B (hereinafter alternatively referred to as processor(s) 604) and a memory, such as random access memory (RAM) 606. The computer 602 is operatively coupled to a display 622, which presents images such as windows to the user on a graphical user interface 618B. The computer 602 may be coupled to other devices, such as a keyboard 614, a mouse device 616, a printer 628, etc. Of course, those skilled in the art will recognize that any combination of the above components, or any number of different components, peripherals, and other devices, may be used with the computer 602.

Generally, the computer 602 operates under control of an operating system 608 stored in the memory 606, and interfaces with the user to accept inputs and commands and to present results through a graphical user interface (GUI) module 618A. Although the GUI module 618B is depicted as a separate module, the instructions performing the GUI functions can be resident or distributed in the operating system 608, the computer program 610, or implemented with special purpose memory and processors. The computer 602 also implements a compiler 612 which allows an application program 610 written in a programming language such as COBOL, C++, FORTRAN, or other language to be translated into processor 604 readable code. After completion, the application 610 accesses and manipulates data stored in the memory 606 of the computer 602 using the relationships and logic that was generated using the compiler 612. The computer 602 also optionally comprises an external communication device such as a modem, satellite link, Ethernet card, or other device for communicating with other computers.

In one embodiment, instructions implementing the operating system 608, the computer program 610, and the compiler 612 are tangibly embodied in a computer-readable medium, e.g., data storage device 620, which could include one or more fixed or removable data storage devices, such as a zip drive, floppy disc drive 624, hard drive, CD-ROM drive, tape drive, etc. Further, the operating system 608 and the computer program 610 are comprised of instructions which, when read and executed by the computer 602, causes the computer 602 to perform the operations herein described. Computer program 610 and/or operating instructions may also be tangibly embodied in memory 606 and/or data communications devices 630, thereby making a computer program product or article of manufacture. As such, the terms "article of manufacture," "program storage device" and "computer program product" as used herein are intended to encompass a computer program accessible from any computer readable device or media.

Those skilled in the art will recognize many modifications may be made to this configuration without departing from the scope of the present disclosure. For example, those skilled in the art will recognize that any combination of the above components, or any number of different components, peripherals, and other devices, may be used.

Conclusion

This concludes the description of the preferred embodiments of the present disclosure.

The foregoing description of the preferred embodiment has been presented for the purposes of illustration and description. It is not intended to be exhaustive or to limit the disclosure to the precise form disclosed. Many modifications and variations are possible in light of the above teaching. It is intended that the scope of rights be limited not by this detailed description, but rather by the claims appended hereto.

What is claimed is:

1. A method of protecting a media program having a plurality of protected frames, the method comprising:
receiving the plurality of protected frames in a client device;
decrypting the plurality of protected frames received in the client device to obtain a plurality of decrypted frames;
decompressing the plurality of decrypted frames to recover a plurality of corrupted frames; and
incompletely decorrupting one or more of a first subset of corrupted frames of the plurality of corrupted frames, according to one or more decorruption operations to produce a first set of frames, wherein incompletely decorrupting the one or more of the first subset of corrupted frames is performed according to an identity of the client device and represent a watermark traceable to the client device.

2. The method of claim 1, further comprising:
completely decorrupting one or more of a second subset of corrupted frames of the plurality of corrupted frames according to the one or more decorruption operations in a trusted execution environment (TEE) to produce a second set of frames;
watermarking, in the TEE, at least a portion of the second set of frames according to the identity of the client device to produce one or more watermarked frames; and
providing the one or more watermarked frames to a screen for display.

3. The method of claim 1, further comprising receiving the one or more decorruption operations in the client device.

4. The method of claim 3, wherein the media program is provided from a content provider for broadcast by a service provider, and the one or more decorruption operations are received in the client device from the service provider.

5. The method of claim 3, wherein the media program is provided from a content provider for broadcast by a service provider, and the one or more decorruption operations are received by the client device from the content provider.

6. The method of claim 1, wherein the client device pre-stores the one or more decorruption operations, and wherein:
the method further comprises receiving an identifier of the one or more decorruption operations, wherein the one or more decorruption operations are identified by the received identifier.

7. The method of claim 1, further comprising:
completely decorrupting only one or more of a second subset of corrupted frames of the plurality of corrupted frames to produce a second set of frames, according to the one or more decorruption operations.

8. The method of claim 1, wherein:
each of the first subset of corrupted frames comprises a plurality of blocks, each of the plurality of blocks comprising a plurality of pixels; and
the one or more decorruption operations comprise a first decorruption operation and a second decorruption operation applied after the first decorruption operation to a subset of the plurality of pixels of each of the first subset of corrupted frames, the subset of the plurality of pixels defined according to the identity of the client device.

9. The method of claim 1, wherein:
the client device generates on-screen graphics to be overlaid on the first subset of frames.

10. The method of claim 1, wherein the plurality of protected frames are produced by:
corrupting at least a first portion of the first set of frames to produce the plurality of corrupted frames;
compressing the plurality of corrupted frames to produce the plurality of decrypted frames; and
encrypting the plurality of decrypted frames to produce the plurality of protected frames.

11. The method of claim 10, wherein:
a content provider of the media program performs the corrupting; and
a service provider of the media program performs the encrypting.

12. The method of claim 10, wherein:
a content provider of the media program performs the corrupting according to a first corruption operation; and
a service provider of the media program further performs the corrupting according to a second corruption operation.

13. A client device for protecting a media program having a plurality of protected frames, the client device comprising:
one or more processing units configured to:
receive the plurality of protected frames in the client device;
decrypt the plurality of protected frames received in the client device to obtain a plurality of decrypted frames;
decompress the plurality of decrypted frames to recover a plurality of corrupted frames; and
incompletely decorrupt one or more of a first subset of corrupted frames of the plurality of corrupted frames, according to one or more decorruption operations to produce a first set of frames, wherein incompletely decorrupting the one or more of the first subset of corrupted frames is performed according to an identity of the client device and represent a watermark traceable to the client device.

14. The client device of claim 13, wherein the one or more processing units are further configured to:
completely decorrupt one or more of a second subset of corrupted frames of the plurality of corrupted frames according to the one or more decorruption operations in a trusted execution environment (TEE) to produce a second set of frames;
watermark, in the TEE, at least a portion of the second set of frames according to the identity of the client device to produce one or more watermarked frames; and
provide the one or more of watermarked frames to a screen for display.

15. The client device of claim 13, wherein the one or more processing units are further configured to receive the one or more decorruption operations in the client device.

16. The client device of claim 15, wherein the media program is provided from a content provider for broadcast by a service provider, and the one or more decorruption operations are received in the client device from the service provider.

17. The client device of claim 15, wherein the media program is provided from a content provider for broadcast by a service provider, and the one or more decorruption operations are received by the client device from the content provider.

18. The client device of claim 13, wherein the one or more decorruption operations are pre-stored in the client device, and wherein:
the one or more processing units are further configured to receive an identifier of the one or more decorruption operations, wherein the one or more decorruption operations are identified by the received identifier.

19. The client device of claim 13, wherein the one or more processing units are further configured to generate on-screen graphics configured to be overlaid on the first set of frames.

20. The client device of claim 13, wherein the one or more processing units are further configured to produce the plurality of protected frames by:
corrupting at least a first portion of the first set of frames to produce the plurality of corrupted frames;
compressing the plurality of corrupted frames to produce the plurality of decrypted frames; and
encrypting the plurality of decrypted frames to produce the plurality of protected frames.

21. The client device of claim 20, wherein:
a content provider of the media program performs the corrupting; and
a service provider of the media program performs the encrypting.

22. The client device of claim 20, wherein:
a content provider of the media program performs the corrupting according to a first corruption operation; and
a service provider of the media program further performs the corrupting according to a second corruption operation.

* * * * *